United States Patent [19]
Malbrel et al.

[11] Patent Number: 5,881,812
[45] Date of Patent: Mar. 16, 1999

[54] FILTER FOR SUBTERRANEAN USE

[75] Inventors: Christophe A. Malbrel, Paris, France; Michael B. Whitlock; Stephen A. Geibel, both of Cortland, N.Y.

[73] Assignee: Pall Corporation, East Hills, N.Y.

[21] Appl. No.: 878,529

[22] Filed: Jun. 19, 1997

Related U.S. Application Data

[60] Provisional application No. 60/020,201 Jun. 20, 1996.
[51] Int. Cl.$^6$ ...................................................... E21B 43/08
[52] U.S. Cl. ............................................ 166/278; 166/51
[58] Field of Search .................................. 166/227, 229, 166/230, 235, 278, 51, 369, 228, 187

[56] References Cited

U.S. PATENT DOCUMENTS

| | | | |
|---|---|---|---|
| 1,677,606 | 7/1928 | Thorpo et al. | 166/227 |
| 3,850,813 | 11/1974 | Pall et al. | 210/232 |
| 4,421,170 | 12/1983 | Swift, Jr. et al. | 166/312 |
| 5,509,483 | 4/1996 | Craen | 166/51 X |
| 5,611,399 | 3/1997 | Richard et al. | 166/230 |
| 5,782,299 | 7/1998 | Simone et al. | 166/230 |

FOREIGN PATENT DOCUMENTS

| | | |
|---|---|---|
| 0126318 | 11/1984 | European Pat. Off. . |
| 1518097 | 7/1978 | United Kingdom . |
| WO 9618022 | 6/1996 | WIPO . |

*Primary Examiner*—Frank S. Tsay
*Attorney, Agent, or Firm*—Leydig, Voit & Mayer

[57] ABSTRACT

A filter for subterranean environments includes an inner support member capable of transporting a fluid in an axial direction thereof, a filter body disposed around the inner support member and including a filter medium, and one or more end connectors surrounding the inner support member and each connected to an end of the filter body. Each end connector has a structure such that it can be installed on an inner support member having lengthwise ends with an outer diameter larger than the inner diameter of the end connector. According to one form of the invention, an end connector comprises a plurality of arcuate sections which are combined to surround the inner support member and are immobilized with respect to each other. According to another form of the invention, an end connector comprises a split annulus having two circumferential ends. The annulus can be deformed between an expanded state in which the annulus can be fit over the inner support member and a closed state in which the annulus fits sufficiently closely around the inner support member to be sealed to it. According to another form of the invention, an end connector comprises concentric inner and outer sleeves.

36 Claims, 10 Drawing Sheets

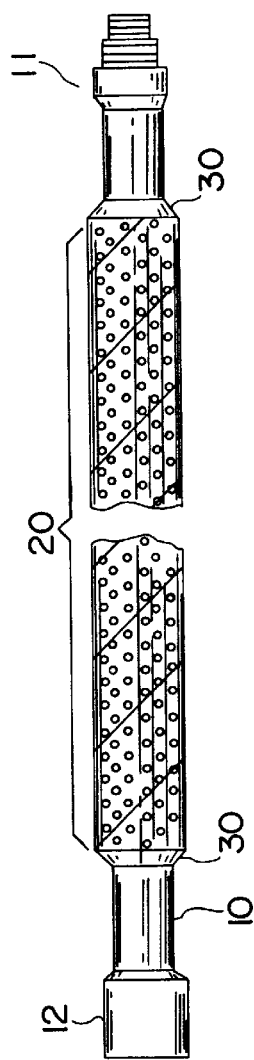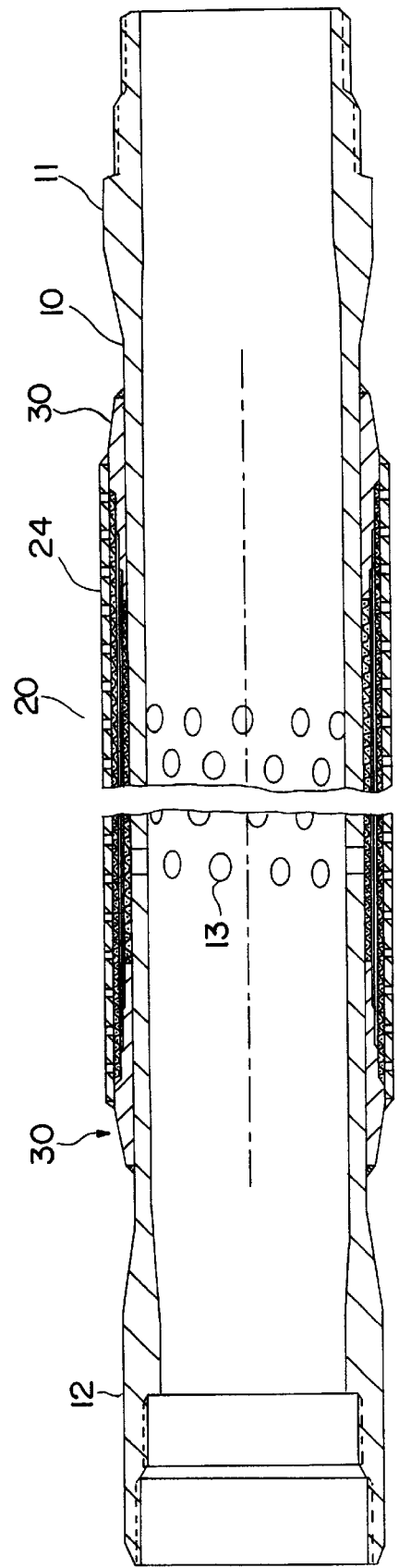

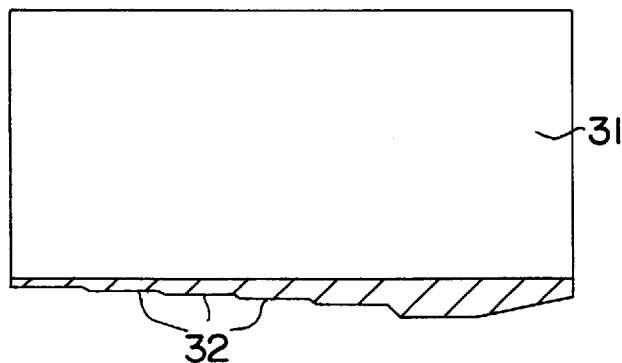
FIG. 5
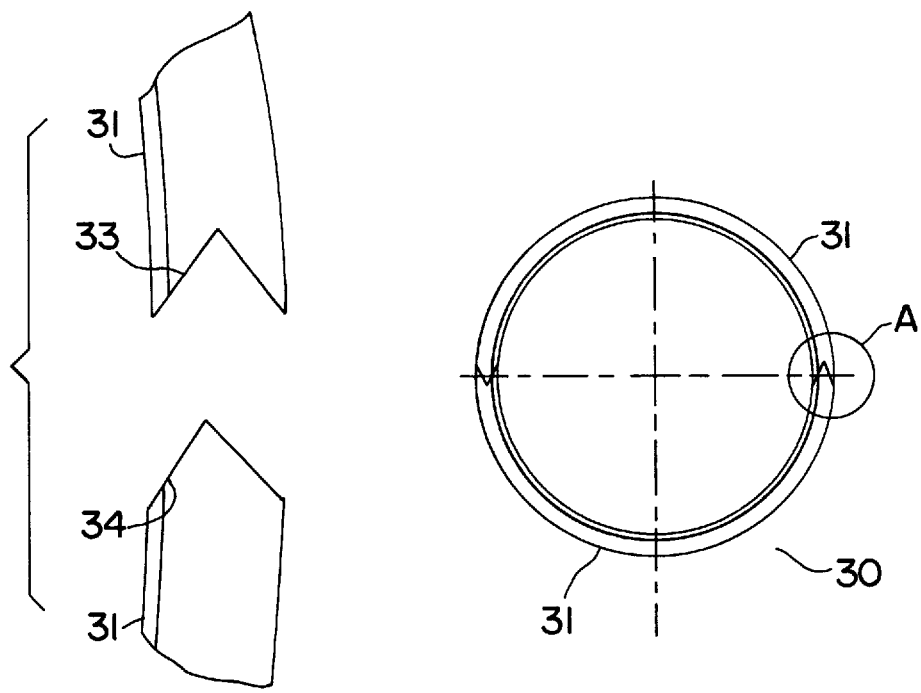
FIG. 6
FIG. 7

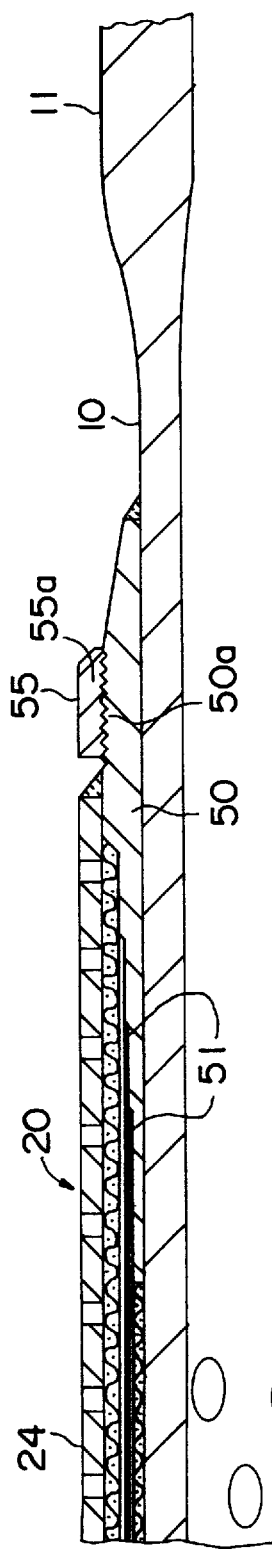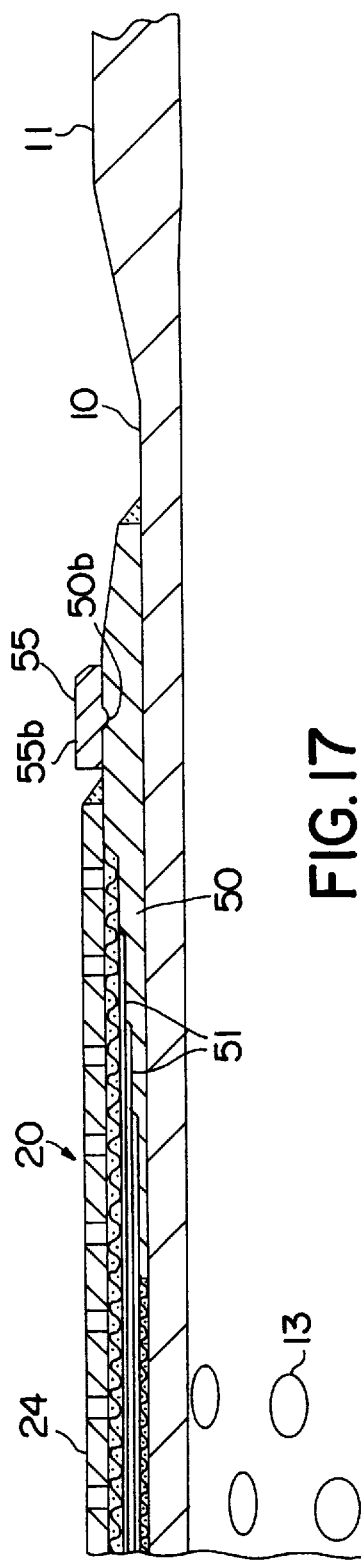

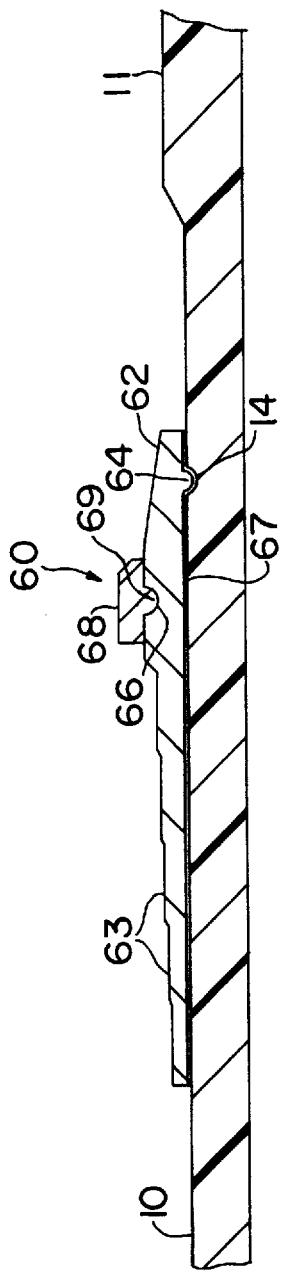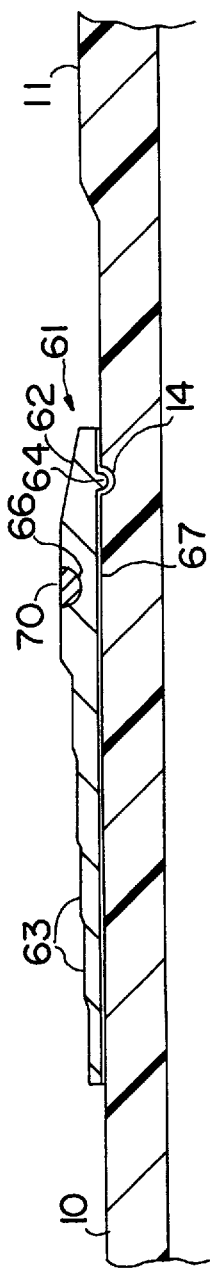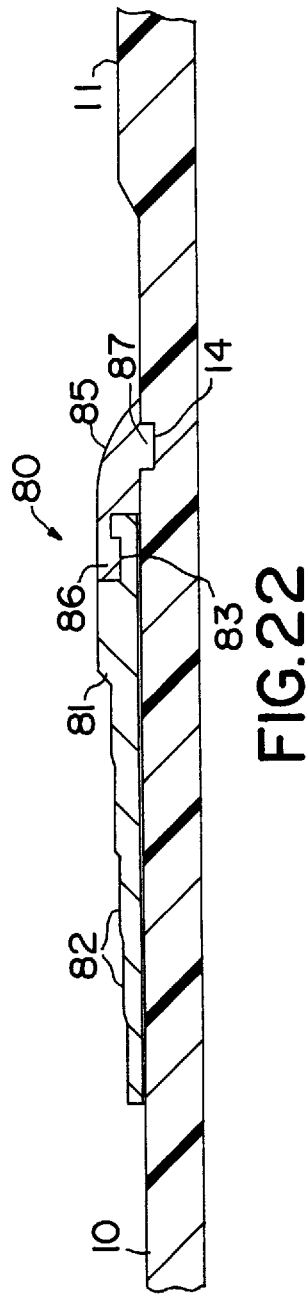

FILTER FOR SUBTERRANEAN USE

REFERENCE TO RELATED APPLICATIONS

This application claims the benefit of U.S. Provisional Patent Application No. 60/020,201 filed on Jun. 20, 1996.

BACKGROUND OF THE INVENTION

1. Field of the Invention

This invention relates generally to filters for use in subterranean environments, such as in oil and gas wells, water wells, and geothermal wells, and for other applications in which it is desired to remove a liquid or gas from the ground without bringing soil particles, such as sand or clay, up with the liquid or gas. In particular but not exclusively, it relates to filters which can be formed from pipes having externally upset ends.

2. Description of the Related Art

Filters are frequently used in subterranean wells in order to remove undesirable particles from liquids or gases produced by the wells. Typical particles which need to be filtered out are sand and clay, which can be highly damaging if allowed to enter into pumps and other well production equipment along with the production fluid.

A typical well filter includes a filter body, containing a filter medium, mounted on a length of well pipe which serves as an inner support member for the filter body. The lengthwise ends of the filter body are protected and sealed to the pipe by annular end connectors. The lengthwise ends of the well pipe are equipped with threaded portions by means of which the filter can be connected to a string of pipe, to a down-hole pump, or to other well equipment.

When a pipe string within a well is subjected to high stresses, a failure phenomenon referred to as "jump out" may occur in which the mating threads of adjoining lengths of the pipe making up the string become disengaged, permitting well fluid to flow into the pipe string where the jump out took place. This phenomenon is particularly common in horizontal or highly deviated wells, in which the pipe string is subjected to high bending loads at the connections between pipes. The likelihood of jump out can be reduced by the use of pipe having upset ends. Upset ends refers to end portions of a pipe having a greater wall thickness than the body of the pipe. A pipe having one or more upset ends is sometimes referred to as an upset pipe. The increased wall thickness of an upset end produces a difference in the inner or outer diameter of the upset end relative to that of the body of the pipe. If the maximum outer diameter of the upset end is greater than that of the body of the pipe, the upset end is described as being externally upset. If the minimum inner diameter of the upset end is less than that of the body of the pipe, the upset end is described as being internally upset. An upset pipe may be both externally and internally upset at the same time, in which case the maximum outer diameter is greater than that of the body of the pipe while the minimum inner diameter is less than that of the body of the pipe. In the present description, "externally upset" will be used to refer to upset ends which have an increased outer diameter relative to the body of the pipe, whether or not the ends are also internally upset.

Various modes of failure besides jump out can also be prevented or made less likely by the use of pipe with upset ends. In addition, lengths of pipe with upset ends can be connected directly to each other without the use of a coupling, so the sealing integrity of the connections between lengths of pipe with upset ends can be higher than the sealing integrity of connections employing couplings because of fewer locations in which a seal needs to be formed. For these reasons, it is highly advantageous to use a pipe having upset ends as an inner support member for a well filter.

However, conventional well filters are designed to be assembled by sliding the filter body, end connectors, and other components of the filter over one of the ends of the inner support member of the filter. Therefore, no portion of the inner support member can have an outer diameter which is larger than the minimum inner diameter of the filter body and other members to be installed on the inner support member. This precludes the use of pipe with externally upset ends as an inner support member for a conventional well filter.

SUMMARY OF THE INVENTION

It is an object of the present invention to provide a filter for subterranean use having an inner support member which may have portions with a maximum outer diameter which is larger than the minimum inner diameter of components of the filter to be mounted on the inner support member. In particular, it is an object of the present invention to provide a filter which can employ a pipe having externally upset ends as an inner support member.

It is another object of the present invention to provide an end connector for a filter for subterranean use, the end connector being capable of installation on a pipe having externally upset ends.

It is yet another object of the present invention to provide an end connector for a filter for subterranean use which can be installed on a pipe without passing over an axial end of the pipe.

It is a further object of the present invention to provide a method of assembling a filter.

The present invention provides a filter including an inner support member capable of transporting a fluid in an axial direction thereof, a filter body disposed around the inner support member and including a filter medium, and at least one end connector surrounding the inner support member and connected to a lengthwise end of the filter body. The end connector has a structure such that it can be installed on an inner support member having lengthwise ends with a maximum outer diameter larger than the minimum inner diameter of the end connector.

According to one form of the present invention, the end connector comprises a plurality of discrete arcuate sections which are combined to form an annulus surrounding the inner support member.

According to another form of the present invention, an end connector comprises a one-piece split annulus having two circumferential ends. The annulus can be deformed between an expanded state in which the circumferential ends are spaced from each other by a distance sufficient to enable the annulus to be mounted on the inner support member, and a closed state in which the annulus can be sealed to the inner support member.

According to still another form of the present invention, an end connector comprises an inner annular member surrounded by an outer annular member. The inner annular member may comprise a plurality of discrete arcuate sections, or it may comprise a one-piece split annulus. The outer annular member may comprise one or more sections.

A method of assembling a filter according to one form of the present invention includes installing an annular end connector around an elongated inner support member, forming a filter body including a filter medium around the inner support member, and connecting the end connector to a lengthwise end of the filter body. In one aspect of the invention, the end connector is installed on the inner support member without passing over a lengthwise end of the inner support member. In another aspect of the invention, the end connector is installed on the inner support member by deforming the end connector between an expanded state in which it can pass over a portion of the inner support member and a closed state in which it can be sealed to the inner support member.

In this description, the term "annular" when referring to an end connector describes a member which has generally the shape of a body of revolution, without regard to the axial length of the member. Thus, both rings and cylinders will be considered as being annular.

A filter according to the present invention is capable of employing a pipe having externally upset ends as an inner support member, so the strength of a connection between the filter and an adjoining member can be greatly increased, reducing the likelihood of the filter becoming disconnected from the other member or being damaged by stresses applied to it during use. However, a filter according to the present invention is not limited to one having an inner support member with externally upset ends, nor is an end connector according to the present invention restricted to use with an inner support member having externally upset ends. An end connector capable of being installed on a pipe with externally upset ends is useful in any situation in which there is some obstruction which makes it difficult to pass the end connector over the end of the inner support member. For example, such an end connector can be installed on an inner support member which is already connected in series with a pipe string without having to detach the inner support member from the pipe string. Such an end connector is also useful when the inner support member has equipment mounted thereon, such as a centralizer or collar, which has a maximum outer diameter greater than the minimum inner diameter of the end connector.

A filter according to the present invention can be employed in any desired manner in a wide variety of underground environments, such as in oil or gas wells, water wells, geothermal wells, and leaching ponds. For example, the filter can be used in cased hole gravel pack completion in which the filter is disposed inside a gravel pack in the production zone of an oil or gas well, in an open hole gravel pack in which the filter is disposed in a gravel pack without being surrounded by casing, in filtration without a gravel pack, in open hole completion in which the filter is introduced into a well as part of a pipe string and the formation surrounding the well bore is allowed to fall in on the filter, in well completion in which the filter is installed in a drill string and left in the well with the drill string at the completion of drilling, in coiled tubing completions and workovers in which the filter is connected to coiled tubing, with wire-line in which the filter is lowered into a well by wire-line and sealed in place in the well, for pump protection in which the filter is installed on or upstream of the inlet of a subsurface pump, in ground remediation in which underground fluids are brought to the surface via the filter or compressed air is passed through the filter to form air bubbles and perform air sparging, and in leaching ponds for filtering ion-containing liquids which leach from ores in the pond. Details of the manner of using the filter in these and other environments are described in U.S. patent application Ser. No. 08/351,658 by Koehler et al. filed on Dec. 7, 1994 and entitled "Filter for Subterranean Wells", which is incorporated by reference.

BRIEF DESCRIPTION OF THE DRAWINGS

FIG. 1 is a side elevation of an embodiment of a filter according to the present invention.

FIG. 2 is a longitudinal cross-sectional view of the lengthwise ends of the filter of FIG. 1.

FIG. 5 is a longitudinal cross-sectional view of one of the connector sections of the end connector of FIG. 4.

FIG. 6 is an end view of two of the circumferential ends of the connector sections shown in FIG. 4.

FIG. 7 is an end view of the end connector of FIG. 4 in an assembled state.

FIGS. 16 and 17 are longitudinal cross-sectional views of portions of other embodiments of a filter according to the present invention having an end connector with an inner sleeve and an outer sleeve.

FIG. 20 is a longitudinal cross-sectional view of a portion of the end connector of FIG. 19 in an assembled state.

FIGS. 21 and 22 are longitudinal cross-sectional views of other embodiments of an end connector mounted on an inner support member without welding.

DESCRIPTION OF PREFERRED EMBODIMENTS

Figure 3:
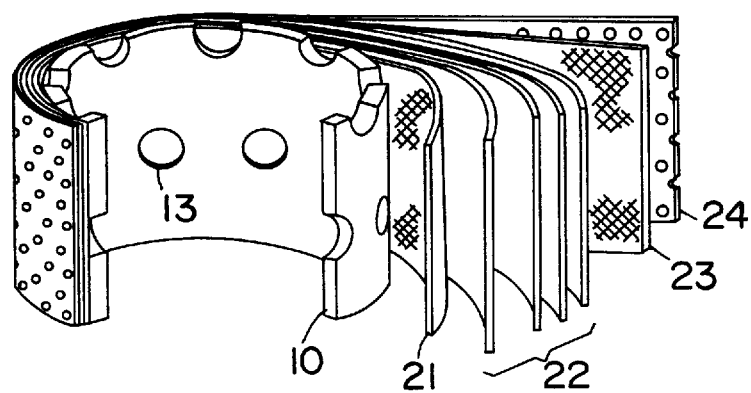
FIG. 3 is an isometric view of a section of the midportion of the filter of FIG. 1 in a partially disassembled state.

FIGS. 1 through 9 illustrate a first embodiment of a filter according to the present invention. One example of an application of this filter is to remove sand or clay from fluid produced by a well for oil or gas, but as stated above, a filter according to the present invention can be used in a wide variety of applications and is not limited to a specific application.

The filter includes an inner support member 10, a filter body 20 which is disposed around the inner support member 10 and includes a filter medium, and an end connector 30 which is connected to each lengthwise end of the filter body 20.

This embodiment is intended to be connected in series with a pipe string which is inserted into a well. The illustrated filter can be installed at any desired location in the pipe string, such as near the bottom end of the string. The string may include one or more of the filters, either connected directly with one another or separated by lengths of pipe or other members. Depending upon the length of the region within the well in which it is desired to form filtration, a large number of the filters may be connected in a series extending for up to thousands of feet in length. The filter can be deployed vertically, horizontally, or at any other angle within a well.

The inner support member 10 provides strength and rigidity to the filter and serves to axially transport filtrate which has passed through the filter body 20 to outside the filter to enable the filtrate to be collected. For example, the inner support member 10 may fluidly communicate with a pipe string or other conduit which extends to the outside of the well. Usually, the inner support member 10 is a hollow, tubular member, such as a pipe or a cage, and has perforations, slits, pores, or other openings in its peripheral wall which permit fluid to flow through its peripheral wall into the hollow center of the inner support member 10, but the inner support member 10 need not be hollow as long as it is capable of transporting filtrate. For example, it may be a solid member (one without a central bore) made of a porous material through which filtrate can flow axially, or it may be a member, either solid or hollow, having a peripheral wall which is impervious to fluid but which has axially-extending channels in its outer surface for the transport of filtrate. For reasons of strength, it is usually cylindrical, but other shapes may be employed, such as a shape with a polygonal or oval transverse cross section, and the transverse cross section may vary along its length. The inner support member 10 may be equipped with connecting portions (such as threaded portions) at one or both of its lengthwise ends to enable the inner support member 10 to be connected to tubing, pumps, similar filters, or other members. To increase the strength of a connection between the connecting portions and adjoining members, one or both lengthwise ends of the inner support member 10 may be externally upset. When the filter is intended to be used in a well for oil and gas and to be connected in series with a string of production pipe, a production pipe having perforations over a portion of its length is particularly suitable as the inner support member 10, since the threaded connectors of the production pipe will have the same strength as that of the connectors of the pipe string to which the filter is to be connected. If the inner support member 10 is expected to be subjected to only low radial or axial forces, light-weight lockseam tubing or polymeric tubing may be employed for the inner support member 10. If the filter is to be installed at the tail end of a pipe string or other conduit, the lower end of the inner support member 10 may be closed off with a bull plug or similar member.

In the embodiment of FIG. 1, the inner support member 10 is formed from a length of commercially available oil well tubing having two externally upset ends. One upset end 11 is formed with an externally threaded pin, and the other upset end 12 is formed with an internally threaded box which can engage with a pin like that formed at the first upset end 11. The upset ends 11 and 12 will usually be integrally formed with the body (the midportion) of the inner support member 10, although it is also possible for the ends to be separately formed and then joined in series with the body by welding or other suitable method. Perforations 13 for filtrate are formed in the peripheral wall of the inner support member 10 in a region on which the filter body 20 is mounted. Both ends in this embodiment are also internally upset, with a smaller minimum inner diameter than the midportion of the inner support member 10.

The inner support member 10 can be made of any material capable of withstanding the conditions to which the inner support member 10 is to be subjected during installation and use, including metals, cement, ceramics, and plastics such as polyvinyl chloride, high-density polyethylene, and glass fiber reinforced plastics. When the inner support member 10 is formed from a length of production pipe, it will typically be made of steel.

The length of the inner support member 10 is not critical, and one or more filter bodies 20 can be mounted on a single inner support member 10. Members other than a filter body 20 and end connectors 30 can also be mounted on the inner support member 10, such as conventional centralizers for guiding the filter as it is inserted into a well bore.

The filter body 20 includes a filter medium suitable for the type of fluid treatment which the filter body 20 is intended to perform. In the present embodiment, the filter medium is one which can filter a well fluid to remove undesired particles or other undesired substances from the well fluid and form a filtrate. The filter body 20 may have any structure and contain any type of filter medium capable of performing the desired removal of substances from the fluid being filtered. For example, it may be a prepacked body, a wire-wrapped body, a sintered metal unitary body, a wire mesh body, or any other type of filter body. Depending on the shape of the inner support member 10, the filter body 20 may be a preformed tubular unit which is completely assembled prior to being slipped over the inner support member 10, it may be a built-up member which is assembled on the inner support member 10, or it may be a combination of a built-up portion which is assembled on the inner support member 10 and a preformed portion which is slipped over the outside of the built-up portion after the built-up portion has been completed. When the inner support member 10 is equipped with externally upset ends and the filter body 20 is intended to fit closely around the outer periphery of the inner support member 10, at least the radially inner portion of the filter body 20 will usually be built up on the inner support member 10, since a preformed unit will typically need to have a minimum inner diameter which is at least as great as the maximum outer diameter of the externally upset ends in order to be able to slip over the externally upset ends.

The filter body 20 need not have any particular shape. Usually, it will have an inner periphery which is similar in shape to the outer periphery of the inner support member 10 so that the inner support member 10 can physically support the filter body 20, and the outer periphery will usually be rounded (such as cylindrical) to make it easier for the filter body 20 to pass through well casing.

Fluid may be passed through the filter body 20 in either the radially inward or radially outward direction. In most applications, fluid will normally flow radially inward through the filter body 20 during filtration. However, in some applications, such as acidizing of a well, steam injection, injection of gas or water into a reservoir to maintain pressure or dispose of unwanted fluids, air sparging, or backwashing, fluid may be directed radially outwards through the filter.

Examples of filter bodies which are particularly suitable for use in wells for oil and gas and in other subterranean environments and which can be used in the present invention are disclosed in U.S. patent application Ser. No. 08/351,658. The filter bodies described in that application include a supported porous medium, which is a filter medium including a foraminate support, such as a mesh, and particulates, such as powders and/or fibers, sintered to the foraminate support. For example, the particulates may be supported within openings of the foraminate support. A supported porous medium provides a filter having excellent damage resistance, meaning that the filter substantially retains its filtering integrity even when significantly deformed. An example of a supported porous medium for use in the present invention is a sintered supported porous metal sheet material disclosed in U.S. Pat. No. 4,613,369. This material, which is available from Pall Corporation under the trademark PMM, can be manufactured from a wide variety of metals, such as nickel, iron, chromium, copper, molybdenum, tungsten, zinc, tin, aluminum, cobalt, iron, and magnesium, as well as combinations of metals and metal alloys including boron-containing alloys. For a filter intended for use in a well for oil or gas, nickel/chromium alloys are particularly suitable. Of these, AISI designated stainless steels which contain nickel, chromium and iron are particularly preferred. Another example of a supported porous medium which is particularly suitable for use in subterranean environments is that manufactured by Pall Corporation under the designation PMF II.

In addition to some type of filter medium, the filter body 20 may include a variety of other layers and components, such as drainage layers to assist the flow of fluid to be filtered into the filter medium and the flow of filtrate into the inner support member 10, cushioning layers to prevent abrasion of the filter medium, diffusion layers placed between layers of filter medium to permit edgewise flow of fluid, layers for selectively blocking flow through portions of the filter body 20, and a protective member, such as an outer cage or wrap member, for protecting the filter body 20 from damage. The structure and use of these and other components of a filter body are well known to those skilled in the art.

FIG. 2 and 3 illustrate the structure of the filter body 20 of the embodiment of FIG. 1. The filter body 20 includes an inner drainage layer 21 comprising a metal mesh wrapped around the outer surface of the inner support member 10 in a region encompassing the perforations 13. A plurality of layers of a supported porous filter medium 22 are wrapped around the inner drainage layer 21, and an outer drainage layer 23 is wrapped around the filter medium 22. The wrapped layers 21–23 are protected by a perforated cage 24 which is secured at its lengthwise ends to the end connectors 30. The layers 21–23 may be wrapped around the inner support member 10 in a variety of manners, such as helically (with each layer extending along the length of the inner support member 10 in the shape of a helix), spirally (with a layer being wrapped around itself a plurality of times but remaining in the same lengthwise position on the inner support member 10), or cylindrically (with each layer wrapped around the inner support member 10 a single time and forming a cylinder). Preferably, each of the wrapped layers 21–23 is secured to the end connectors 30 without being secured to the adjoining wrapped layers to permit the individual layers to shift with respect to each other. Methods of constructing such a filter body are described in detail in U.S. patent application Ser. No. 08/351,658. The illustrated filter body 20 comprises wrapped layers, but it may instead comprise a pleated composite, as also described in U.S. patent application Ser. No. 08/351,658. The pleats of a pleated composite are preferably in a laid-over state to maximize volumetric efficiency.

In this embodiment, the cage 24 has a minimum inner diameter large enough for the cage 24 to be slipped over either lengthwise end of the inner support member 10. Alternatively, the cage 24 may comprise a plurality of sections (such as semicylindrical sections) which are assembled around the inner support member 10 and then welded to each other along lengthwise seams to form a complete cylinder, or it may comprise a split annulus which is expanded to allow it to fit over the lengthwise ends of the inner support member and is then welded along a lengthwise seam to form a complete cylinder. In cases in which the cage 24 is assembled around the inner support member 10, it may have a minimum inner diameter in an assembled state which is smaller than the maximum outer diameter of the lengthwise ends of the inner support member 10.

The filtering characteristics of the filter body 20 can be selected in accordance with the size of the particles which need to be removed, the desired flow rate, the desired pressure drop, etc.

The end connectors 30 serve to connect the filter body 20 to the inner support member 10 in a manner which prevents particles large enough to be removed by the filter body 20 from bypassing the filter body 20 and flowing into the inner support member 10. In applications in which it is expected that axial forces may be applied to the filter body 20 during installation of the filter in a well, one or both of the end connectors 30 may be connected to the inner support member 10 in a manner enabling it to resist these forces to prevent the filter body 20 from sliding along the inner support member 10 under the applied forces. Conversely, in applications in which the filter body 20 is expected to be subject to thermal strain (either expansion or contraction) different from that of the inner support member 10, one or both of the end connectors may be capable of lengthwise movement relative to the inner support member 10 to permit the thermal strain to take place without damage to the filter body 20. It is not necessary for both end connectors to have the same characteristics in order for the filter as a whole to resist the application of axial forces on the filter body 20 or to permit the filter body 20 and the inner support member 10 to expand or contract at different rates. For example, one end connector can be rigidly connected to the inner support member 10 to resist external axial forces, while the other end connector can be slidably connected to the inner support member 10 to permit relative movement of the inner support member 10 and the filter body 20 during thermal expansion. If the filter is not expected to undergo any significant thermal expansion, or if there is not expected to be any significant difference between the thermal strain of the filter body 20 and that of the inner support member 10, both of the end connectors may be connected to the inner support member 10 in a manner preventing lengthwise movement of the end connectors relative to the inner support member 10. In addition, if the end connectors are not expected to be subjected to any significant external axial forces, both of the end connectors may be capable of lengthwise movement relative to the inner support member 10.

In many applications, the filter body 20 will be equipped with an end connector 30 at each of its lengthwise ends, but in some situations, it may be possible to omit one of the end connectors 30 and seal a lengthwise end of the filter body 20 directly to the inner support member 10.

The end connectors 30 need not have any particular shape, and they need not be identical to each other. Typically, they will have an outer periphery which is rounded, such as cylindrical, so that there are no sharp corners which can catch on external objects as the filter is being introduced into a well. The inner periphery will usually have a shape corresponding to that of the outer periphery of the inner support member 10 so that the end connectors 30 can be easily sealed to the inner support member 10. Thus, if the outer periphery of the inner support member 10 is cylindrical, the end connectors 30 will typically be bodies of revolution, such as rings or cylinders. The inner periphery of each end connector 30 may but need not be parallel to the outer periphery of the inner support member 10 over the length of the end connector 30.

The end connectors 30 may be connected with the filter body 20 by any method suited to the materials employed for these members, such as welding, brazing, sintering, adhesive bonding, or a mechanical sealing method such as swaging, crimping, or an interference fit. The method of connection is one which can prevent particles large enough to be removed by the filter body 20 from passing between the filter body 20 and the end connectors 30.

The end connectors 30 may overlap in the lengthwise direction the perforations 13 formed in the inner support member 10, but it may be desirable if there is a space between the inner lengthwise ends of the end connectors 30 and the outer lengthwise ends of the region of the inner support member 10 in which the perforations 13 are formed. For example, there may be a lengthwise gap of approximately 2 inches between the inner lengthwise ends of the end connectors 30 and the perforations 13 closest to the lengthwise ends of the inner support member 10. If a lengthwise end of the filter body 20 should become detached from one of the end connectors 30 due to abnormal stresses, the presence of this gap in which no perforations 13 are formed will reduce the amount of unfiltered fluid which can flow through the perforations 13 compared to a structure in which the perforations 13 immediately adjoin or overlap the end connectors 30 in the lengthwise direction.

According to one form of the present invention, an end connector 30 comprises a plurality of arcuate connector sections 31 which individually extend around less than the entire periphery of the inner support member 10 but which form a rigid annulus extending around substantially the entire periphery of the inner support member 10 when combined with one another.

There is no restriction on the number of the plurality of connector sections 31 forming the end connector 30. Two semicylindrical connector sections 31 provide the simplest structure, but a larger number of sections may be employed if desired. The connector sections 31 may but need not be identical to each other. For example, the different connector sections 31 may extend around the periphery of the inner support member 10 by different lengths from each other. The circumferential length of the connector sections 31 can be selected in accordance with the desired tightness of the fit between the assembled end connector 30 and the inner support member 10. In the present embodiment, the dimensions of the connector sections 31 are selected so that when the connector sections 31 are combined, they form an annulus which fits sufficiently loosely around the inner support member 10 that the annulus can be readily moved along the length of the inner support member 10 to a desired location, but with a sufficiently small clearance that the annulus can be welded directly to the inner support member 10, if desired. Alternatively, the dimensions of the connector sections 31 can be selected such that there is a snug or tight fit between the assembled end connector 30 and the inner support member 10. For example, the minimum inner diameter of the end connector 30 in a relaxed state may be smaller than the maximum outer diameter in a relaxed state of the portion of the inner support member 10 on which the end connector 30 is to be mounted.

Figure 4:
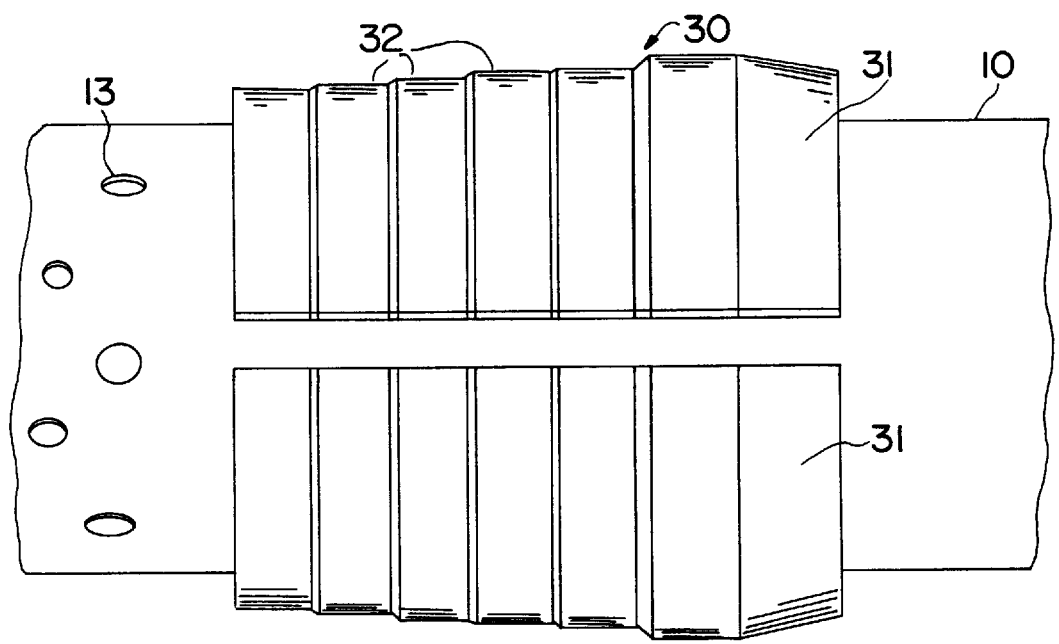
FIG. 4 is an exploded side view of an embodiment of an end connector of a filter according to the present invention.
Figure 8:
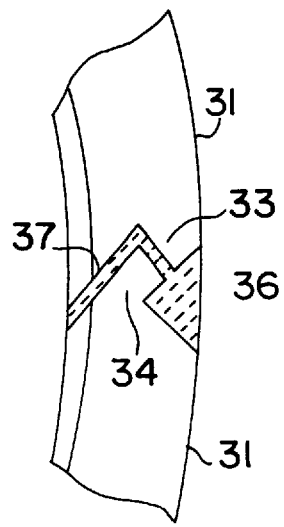
FIG. 8 is an enlarged view of region A of FIG. 6.
Figure 9:
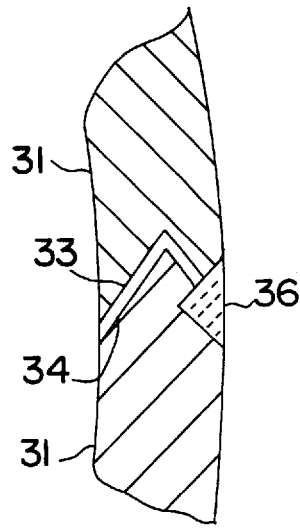
FIG. 9 is a transverse cross-sectional view of a lengthwise seam of the end connector of FIG. 7 at a distance from the outer lengthwise end of the seam.

FIGS. 4–9 illustrate one of the end connectors 30 of the embodiment of FIG. 1. The other end connector 30 may be the same or different in structure. This end connector 30 is an example of a two-section end connector. FIG. 4 is an exploded side view of the end connector 30, FIG. 5 is a longitudinal cross-sectional view of one connector section 31, FIG. 6 is an enlarged view of opposing circumferential ends of the two connector sections 31, FIG. 7 is a view of the outer lengthwise end of the end connector 30 in an assembled state, FIG. 8 is an enlarged view of region A of FIG. 7, and FIG. 9 is a transverse cross-sectional view of the circumferential ends shown in FIG. 8 at a distance from the outer lengthwise end. As shown in these figures, each connector section 31 of the end connector 30 is generally semicylindrical, and when the two connector sections 31 are combined with each other, they define a rigid annulus extending around substantially the entire periphery of the inner support member 10. The two connector sections 31 in this embodiment are of identical structure. Each of the connector sections 31 has an inner lengthwise end (the left end in FIG. 4) which is connected to the filter body 20 and an outer lengthwise end (the right end in FIG. 4) which faces away from the filter body 20. The inner lengthwise end of each connector section 31 may be shaped to make it easier to connect this end to the filter body 20. For example, when the filter body 20 contains a plurality of discrete, concentric wrapped layers, the inner lengthwise end may be formed with circumferentially extending steps 32, each of which can support one or more of the layers of the filter body 20. Alternatively, the inner lengthwise end may be perpendicular or sloped with respect to the longitudinal axis of the inner support member 10.

The outer lengthwise end of each connector section 31 may be beveled or otherwise shaped to reduce the likelihood of its catching on external objects as the filter is introduced into a well or to make it easier to pass a cage 24 or other member over the connector sections 31.

The maximum possible outer diameter of the end connectors 30 will depend upon the structure of the filter body 20. If the filter body 20 is intended to be installed on the inner support member 10 after the installation of the end connectors 30 and the filter body 20 includes a member (such as a rigid outer cage) which needs to be passed over the installed end connectors 30, then the maximum outer diameter of at least one of the end connectors 30 will typically be less than the maximum outer diameter of the filter body 20 to permit the installation of the latter. However, if the end connectors 30 can be installed on the inner support member 10 after the filter body 20, or if the filter body 20 does not include a member which needs to pass over the end connectors 30, then the end connectors 30 may have a maximum outer diameter which is greater than that of the filter body 20. For example, the outer lengthwise ends of the end connectors 30 can be enlarged to be larger in outer diameter than the filter body 20 to provide a robust cross section capable of protecting the filter body against lengthwise impacts.

The end connectors 30 can be made of any materials compatible with the conditions in which the filter is to be used and the materials forming the members to which the end connectors 30 are to be connected, suitable materials for the end connectors 30 including but not being limited to metals, polymers, ceramics, and combinations of these materials. When the filter is intended for use in wells for oil or gas, a corrosion resistant, high strength metal which is compatible with the filter body 20 is particularly suitable. From the standpoint of economy, strength, and durability, steel (such as stainless steel) is frequently an appropriate material. When the filter is used in a non-corrosive environment, such as in a water well, nonmetals, such as polymeric materials, can also be used.

The two connector sections 31 forming an end connector 30 are preferably immobilized with respect to each other in a manner which gives the assembled end connector 30 adequate strength and rigidity to support a lengthwise end of the filter body 20. In many instances, a convenient manner of immobilizing the connector sections 31 is to secure them directly to each other. Alternatively, the connector sections 31 may be individually secured to a third member, such as the inner support member 10, without being directly connected to each other. When the connector sections 31 are made of metal, it is frequently convenient to connect the connector sections 31 directly to each other by welding along lengthwise seams extending between opposite lengthwise ends of the connector sections 31. Examples of immobilizing methods other than welding include the use of screws which pass through the two connector sections 31 tangentially with respect to the inner support member 10, a band clamp or ring which fits around the connector sections 31 and clamps the connector sections 31 against the inner support member 10 and/or against each other, pins which pass longitudinally through overlapping portions of the connector sections 31, bonding, brazing, soldering, casting in place, swaging, and mechanically interlocking portions such as dovetails.

It is desirable to prevent particles large enough to be removed by the filter body 20 from bypassing the filter body 20 by flowing between the connector sections 31 or between the connector sections 31 and the inner, support member 10. A sealing member, such as a gasket, may be disposed between the opposing surface adjoining connector sections 31 as well as between the connector sections 31 and the inner support member 10 to form a seal which prevents such flow. If the contact pressure between the inner periphery of the connector sections 31 and the outer periphery of the inner support member 10 is sufficiently high and the contacting surfaces are sufficiently smooth, the contact alone may be able to form a suitable seal. Alternatively, the connector sections 31 can be joined to each other and to the inner support member 10 in a fluidtight manner, such as by fluidtight lengthwise welds. A seal between adjoining connector sections 31 and a seal between the end connector 30 and the inner support member 10 need not be fluidtight. It is sufficient if the seal can prevent the passage of particles large enough to be removed by the filter body 20. In the present embodiment, the opposing circumferential ends of the connector sections 31 are welded to each other by a fluidtight weld 36 extending along a lengthwise seam over the entire length of the connector sections 31. Since there are two circumferential ends to each connector section 31, the assembled end connector 30 has two lengthwise seams which are approximately diametrically opposed, with the opposing circumferential ends being joined along each seam by one of the welds 36. As shown in FIG. 8, which is an enlarged view of region A of FIG. 7, the opposing circumferential ends of the two connector sections 31 are also welded to each along their axially-facing end surfaces at the outer lengthwise end of the connector sections 31 by a weld 37 to seal this end against fluids between the inner and outer periphery of the end connector 30. As shown in FIG. 9, which is a transverse cross section taken at a location between the lengthwise ends of the end connector 30 of FIG. 7, the lengthwise welds 36 do not need to extend to the inner periphery of the connector sections 31, because the welds 37 on the axially-facing end surfaces at the outer lengthwise end of the connector sections 31 can prevent fluid from flowing along any gap between the circumferential end surfaces of the connector sections 31. For the same reason, it is possible but not necessary to form a weld between the connector sections 31 along the axially-facing end surfaces at the inner lengthwise ends of the connector sections 31. The connector sections 31 are sealed to the inner support member 10 by a weld extending around the entire periphery of the inner support member 10 at the outer lengthwise ends of the connector sections 31. It is possible but unnecessary to weld the inner lengthwise ends of the connector sections 31 to the inner support member 10.

The circumferential ends of each connector section 31 may be shaped to facilitate joining of opposing circumferential ends to each other. In the embodiment of FIG. 4, the opposing circumferential ends of the connector sections 31 are chevron shaped, with a circumferential end of one connector section 31 having a V-shaped recess 33 and the opposing circumferential end of the other connector section 31 having a wedge-shaped projection 34 which is shaped to fit into the recess 33. Chevron-shaped circumferential ends are advantageous because when opposing circumferential ends of two connector sections 31 are interfit with each other, the engagement between the chevron-shaped portions prevents the connector sections 31 from relative movement in the radial direction, so the connector sections 31 can be precisely aligned with one another, making it possible to form a smooth weld between the connector sections 31. Many other shapes are possible for the circumferential ends. For example, they may be cut straight across radially (perpendicular to the outer surface of the inner support member 10), or they may be sloped with respect to the outer surface of the inner support member 10 in the same direction. The circumferential ends may be overlapping or non-overlapping in the circumferential direction of the inner support member 10 (interfitting chevron-shaped ends being an example of overlapping ends). For example, the circumferential ends may overlap to form a scarf joint.

The connector sections 31 of the end connector 30 may be individually formed, or they may be obtained by cutting a complete annulus in the lengthwise direction into a plurality of arcuate connector sections 31. The latter method is often convenient when the connector sections 31 have portions, such as threads, which need to extend smoothly and continuously between the connector sections 31 when the connector sections 31 are assembled to form an end connector 30.

There may be a gap between the opposing circumferential ends of the connector sections 31 when they are assembled around the inner support member 10. If desired, a filler material may be disposed in the gap. If the gap is large, a filler material can make it easier to join the connector sections 31 to each other. In addition, a filler material can be used to form a seal between opposing circumferential ends to prevent particles large enough to be removed by the filter body 20 from bypassing the filter body 20 by flowing along the gap. The filler material is not restricted to any particular material but is preferably one which will not be damaged by a method used to join the connector sections 31 to each other. When the connector sections 31 are joined to each other by welding or when the end connectors 30 are expected to be subjected to elevated temperatures or corrosive conditions during use, an example of a suitable filler material is a porous fiber metal material made of a heat resistant and corrosion resistant metal, such as stainless steel. For example, a filler material can be a strip of a porous fiber metal medium available from Pall Corporation under the trademark PMF. Alternatively, the gap between the circumferential ends of the connector sections 31 can be filled with a weld filler material at the time of welding. In situations in which the filler material need not have any particular heat or corrosion resistance, caulking, various polymeric sealants, or gaskets comprising strips of woven or nonwoven fabrics, rubber, or other polymers can be used as a filler material.

As stated above, in many situations, it may be desirable to rigidly secure at least one of the end connectors 30 of the filter to the inner support member 10 to prevent the filter body 20 from sliding in the lengthwise direction along the outer surface of the inner support member 10 if an external axial force is applied to the filter body 20 or the end connectors 30, such as if one of the end connectors 30 contacts an obstruction in a well bore when the filter is being installed within a well. Any method of securing the end connectors 30 to the inner support member 10 which provides adequate strength can be employed. When the end connectors 30 and the inner support member 10 are both made of metals capable of being welded to each other, welding is a convenient method. A weld can be formed at either lengthwise end of the end connector 30, but usually it is sufficient to weld the outer lengthwise end of the end connector 30 to the inner support member 10. A fluidtight weld extending around the entire periphery of the inner support member 10 is suitable not only for securing the end connector 30 in place but also for forming a seal between the end connector 30 and the inner support member 10. An end connector 30 can be connected to the inner support member 10 either before or after the end connector 30 is connected to the filter body 20.

Methods not requiring welding can also be employed to secure one or both end connectors 30 to the inner support member 10, including adhesive bonding, a friction fit, clamping, and various mechanical methods employing mechanical engagement of the end connectors 30 and the inner support member 10. A variety of suitable methods are described in United States Provisional Patent Application No. 60/017,089, filed on May 9, 1996, and entitled "Filter for Subterranean Use", the disclosure of which is incorporated by reference.

During operation of a filter in a well, the filter may undergo thermal expansion with respect to its dimensions at the time of assembly, such as if steam is introduced into the well through a pipe string to which the filter is connected. Due to differences in the coefficient of thermal expansion of different portions of the filter, or due to different portions of the filter being heated to different temperatures, thermal stresses may develop in the filter. If the thermal stresses are high enough, they may damage the filter body 20 or even pull it apart from one or both of the end connectors 30. To prevent damaging thermal stresses from developing, at least one of the end connectors 30 can be made capable of lengthwise movement relative to the inner support member 10 so that the inner support member 10 and the filter body 20 can expand at different rates. In this case, a movable end connector 30 is not welded to the inner support member 10. Instead, it may be slidably mounted on the inner support member 10, or it may be secured to the inner support member 10 without welding in a manner such that it is restrained from lengthwise movement when an axial force acting on it is below a predetermined level which is low enough not to damage the filter body 20 but can slide with respect to the inner support member 10 when an axial force acting on it exceeds the predetermined level. Various structures for connecting an end connector to an inner support member so as to resist axial forces up to a predetermined level and so as to permit relative lengthwise movement of the end connector and the inner support member above the predetermined level are described in the above-mentioned U. S. Provisional Patent Application 60/017,089. When an end connector 30 is not welded to the inner support member 10, a sealing member for preventing the passage of particles large enough to be removed by the filter body 20 is preferably disposed between the end connector 30 and the outer surface of the inner support member 10.

Figure 10:
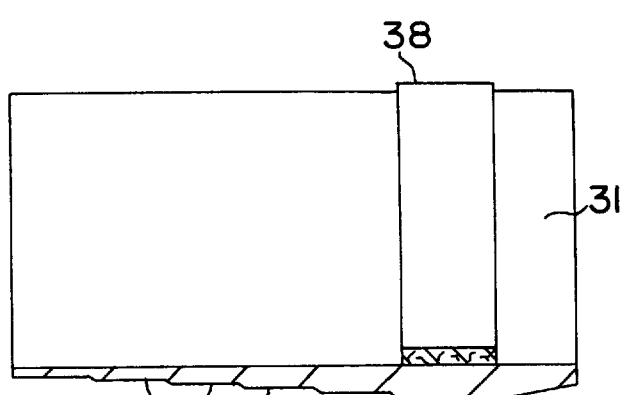
FIG. 10 is a longitudinal cross-sectional view of a connector section of an end connector according to the present invention equipped with a sealing member.
Figure 11:
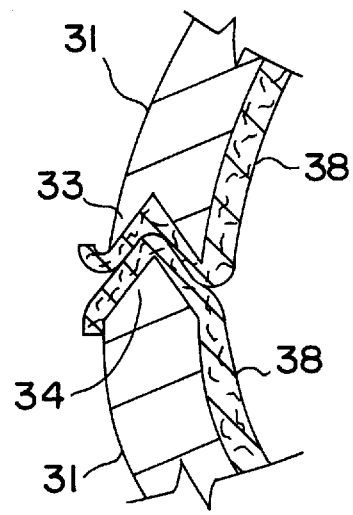
FIG. 11 is a transverse cross-sectional view of the circumferential ends of two connector sections like the one illustrated in FIG. 10 in an assembled state.

A sealing member for this purpose is not limited to any particular type and can be made of any material capable of withstanding the operating conditions of the filter. A few examples of possible types of sealing members which can be employed are 0-rings, V-seals, a sealant in the shape of an elongated bead, crush seals, and flat strips of a sealing material. FIGS. 10 and 11 illustrate an example of a sealing member which is particularly suitable for forming a seal between an end connector 30 and an inner support member 10. The sealing member comprises one or more strips of a gasket material 38 disposed between the outer periphery of the inner support member 10 and the inner periphery of the end connector 30. Preferably, the gasket material 38 extends around the entire periphery of the inner support member 10 so that there are no gaps through which particles can leak. The gasket material 38 may be simply wrapped around the inner support member 10, but in the present embodiment, it is attached to the inner periphery of the connector sections 31 of the end connector 30 before they are assembled around the inner support member 10. As shown in FIG. 11, which is a cross-sectional view of the circumferential ends of two connector sections 31 in an assembled state, the gasket material 38 may extend over the circumferential ends to prevent particles from flowing in the lengthwise direction of the end connector 30 along the gap between the circumferential ends. The circumferential ends of the connector sections 31, with the gasket material 38 compressed between them, can be welded or otherwise immobilized with respect to each other in any of the ways described with respect to the end connector 30 of FIG. 4. When the filter is intended for use in a well for oil or gas, an example of a suitable gasket material 38 is a compressible, porous fiber metal material comprising fibers of a corrosion resistant metal, with a particularly preferred example being a sintered porous metal fibrous material available from Pall Corporation under the trademark PMF. This material can be obtained in sheets having a desired thickness, fiber diameter, and voids volume. The gasket material will typically be compressed against a surface in order to form a seal, and various characteristics of the gasket material, such as its voids volume and pore size, will be different in a compressed state from in an as-manufactured state. Therefore, the grade of the material is selected based on its properties in a compressed state, i.e., so that in a compressed state it can remove or otherwise prevent the passage of particles large enough to be removed by the filter body 20. When the filter is intended for use in a noncorrosive environment, nonmetals such as rubber or other polymer can also be used as a gasket material. If the inner support member 10 and the end connector 30 need to be capable of relative movement in the lengthwise direction of the inner support member 10 to accommodate thermal expansion of the filter, for example, the gasket material 38 may be secured to the connector sections 31 to prevent the gasket material 38 from separating from the connector sections 31 during the relative movement. For example, a gasket material 38 in the form of a fibrous metal material can be spot welded to the inner periphery of the connector sections 31 prior to their assembly around the inner support member 10. The width of the gasket material 38 in the lengthwise direction of the connector section 31 on which it is mounted is not critical, and it may extend over all or a portion of the length of the connector sections 31.

In FIG. 11, the circumferential ends of the connector sections are chevron-shaped 31, but they may have any of the various other shapes described with respect to the previous embodiment.

Figure 12:
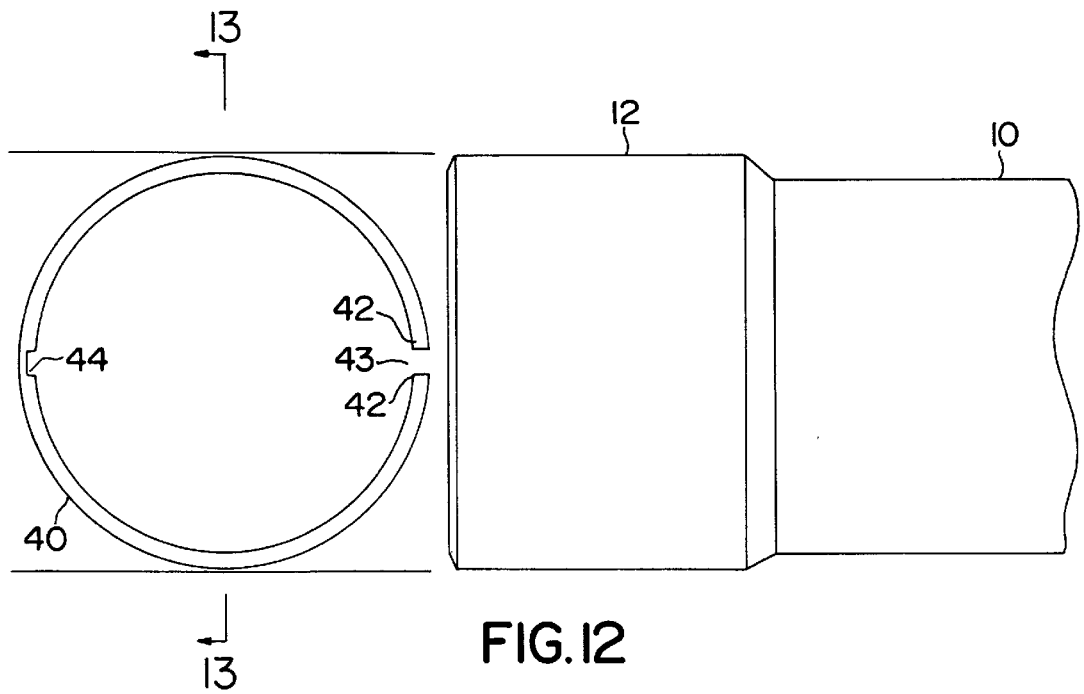
FIG. 12 is an end view of an embodiment of a one-piece end connector alongside an inner support member.
Figure 13:
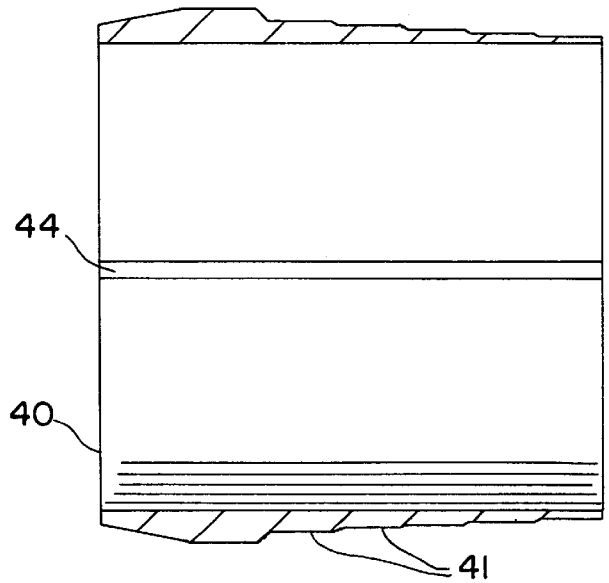
FIG. 13 is a longitudinal cross-sectional view taken along line 13—13 of FIG. 12.
Figure 14:
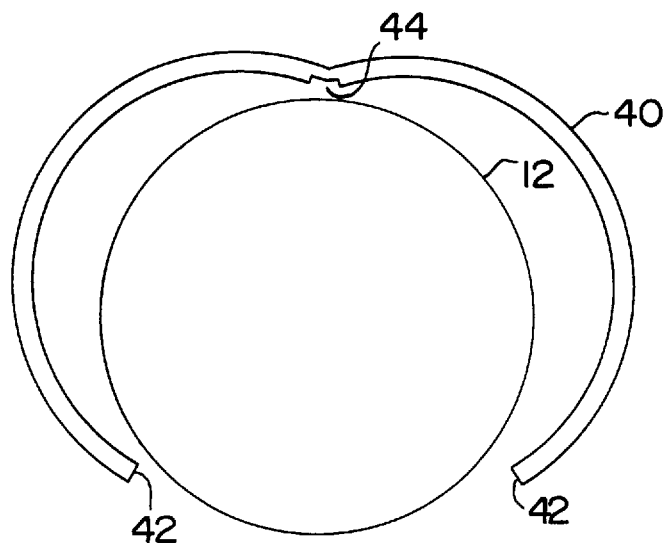
FIG. 14 is an end view of the end connector of FIG. 12 in an expanded state.
Figure 15:
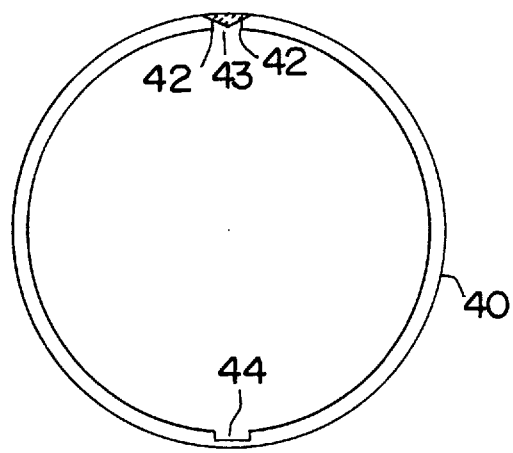
FIG. 15 is an end view of the end connector of FIG. 12 in an assembled state.

According to another form of the present invention, a filter has an end connector comprising a split annulus having circumferential ends which can be spaced from each other by a gap through which a portion of an inner support member of the filter can pass. FIGS. 12–15 illustrate an embodiment of an end connector 40 for such a filter. The overall structure of a filter employing this end connector 40 may be similar to that of the filter shown in FIG. 1, so a description of portions of the filter other than the end connector 40 will be omitted. FIGS. 12 and 14 are end views of the end connector 40 in an initial state and an expanded state, respectively, FIG. 13 is a longitudinal cross-sectional view of the end connector 40 taken along line 13—13 of FIG. 12, and FIG. 15 is an end view of the end connector 40 in a completely assembled state. As shown in these figures, the end connector 40 is a generally cylindrical split annulus having an inner lengthwise end for connection to an unillustrated filter body and an outer lengthwise end which faces away from the filter body when the end connector 40 is mounted on an inner support member. As in the preceding embodiment, the inner lengthwise end of the end connector 40 may be formed with circumferentially extending steps 41 or otherwise shaped to facilitate the connection of the inner lengthwise end to a filter body. The end connector 40 has two circumferential ends 42 between which the end connector 40 is split. The end connector 40 can be deformed, either elastically or plastically, between an expanded state and a closed state. In the expanded state, the circumferential ends 42 are spaced apart from each other by a gap 43 through which a portion of the inner support member 10 can pass to enable the end connector 40 to fit over the inner support member 10. In the closed state, the end connector 40 has the shape of an annulus which fits sufficiently closely around the inner support member 10 that it can be sealed to the inner support member 10. To make it easier to deform the end connector 40 between its open and closed states, the end connector 40 may be formed with one or more relieved portions of reduced cross section which are more flexible than the other portions of the end connector 40. For example, in this embodiment, a relieved portion comprises an axially extending groove 44 formed in the inner periphery of the end connector 40 over its entire length in a location approximately diametrically opposed to the gap 43 between the circumferential ends 42. The depth of the groove 44 can be selected in accordance with the desired ease of deformation of the end connector 40 and the desired strength of the end connector 40 when installed on the inner support member 10. The illustrated end connector 40 has only a single groove 44, but a plurality of similar grooves 44 or other type of relieved portion may be formed in the end connector 40 so that the amount of deformation at each relieved portion required to spread the circumferential ends 42 of the end connector 40 by the desired amount can be less than when there is a single relieved portion, thus reducing the stresses applied to the end connector 40 at each relieved portion.

FIG. 12 shows the end connector in an initial, as-manufactured state. The initial state in this embodiment is a substantially closed state in which the circumferential ends 42 of the end connector 40 are in close proximity to each other and the end connector 40 defines a substantially complete cylinder having a minimum inner diameter smaller than the maximum outer diameter of the upset ends 11 and 12 of the inner support member 10. However, the shape of the end connector 40 in its initial shape is not critical, and the initial state may instead be an expanded state. The end connector 40 can be manufactured by a variety of methods. When the initial, as-manufactured state is a substantially closed state like that shown in FIG. 12, an example of a suitable method of forming the end connector 40 is to cut a complete cylinder from one lengthwise end to the other to split the cylinder and define the two circumferential ends 42.

FIG. 14 illustrates the end connector 40 in an expanded state in which the circumferential ends 42 are spaced apart so that the end connector 40 can be placed over the inner support member 10. In FIG. 14, the circumferential ends 42 are spaced apart by a sufficient distance that the end connector 40 can pass in the lengthwise direction of the inner support member 10 over one or both upset ends 11 and 12 of the inner support member 40. Alternatively, the circumferential ends 42 of the end connector 40 can be spaced apart by a distance greater than or equal to the outer diameter of some portion of the inner support member 10 (such as the region which is to be surrounded by the filter body), and that portion can pass through the gap 43 between the circumferential ends 42 by relative movement of the inner support member 10 and the end connector 40 in the radial direction of the inner support member 10. Thus, depending upon the amount by which the end connector 40 is expanded, it can be mounted on the inner support member 10 with or without passing over a lengthwise end of the inner support member 10.

Once the end connector 40 has been placed over the inner support member 10 in a location between the upset ends 11 and 12, the end connector 40 is closed, i.e., the circumferential ends 42 of the end connector 40 are moved towards each other by bending of the end connector 40 about the groove 44 until the end connector 40 fits sufficiently closely around the inner support member 10 that it can be sealed to the inner support member 10. When the end connector 40 has been closed, the circumferential ends 42 are preferably immobilized with respect to each other to maintain the shape of the end connector 40 and give it rigidity. The circumferential ends 42 can be immobilized by the same methods which can be used to immobilize the connector sections 31 of FIG. 4 with respect to each other. For example, the circumferential ends 42 may be joined directly to each other by a method such as welding to form a lengthwise seam, and/or the end connector 40 can be secured to another member, such as the inner support member 10, in a manner preventing the relative movement of the circumferential ends 42. When the end connector 40 is metallic, welding the circumferential ends 42 to each other is frequently a convenient method for immobilizing them with respect to each other. FIG. 15 shows the end connector 40 of this embodiment in a closed state in which the circumferential ends 42 are welded to each other to form a lengthwise welded seam extending over the entire length of the end connector 40.

As is the case for the end connector 30 of FIG. 4, the end connector 40 of this embodiment may be left unsecured to the inner support member 10 to enable relative lengthwise movement of the end connector 40 and the inner support member 10, or it may be secured to the inner support member 10 by any of the various methods described with respect to the end connector 30 of FIG. 4, such as by welding.

In the illustrated embodiment, the end connector 40 is split along a line extending parallel to the longitudinal axis of the end connector 40, so the resulting lengthwise seam joining the circumferential ends 42 extends parallel to the longitudinal axis. However, the end connector 40 need not be split along any particular path. For example, it may be slit along a zig-zag path, or along one which spirals helically around the end connector 40 between opposite lengthwise ends.

The inner radius of the end connector 40 can be selected in accordance with the desired degree of looseness between the end connector 40 and the inner support member 10 when the end connector 40 is in a closed state. The circumferential ends 42 of the end connector 40 may have any desired shape, such as the various shapes described above for the circumferential ends of the connector sections 31 of FIG. 4.

When the end connector 40 is in a closed state surrounding the inner support member 10, the circumferential ends 42 may be directly contacting one another, or they may be spaced by a gap. If a gap is present, particles large enough to be removed by the filter body 20 are preferably prevented from flowing along the gap in a manner which would allow them to bypass the filter body. For example, the gap can be sealed by welding the circumferential ends 42 to each other in a fluidtight manner over the entire length of the end connector 40 and along the axially-facing end surfaces at the outer lengthwise end of the end connector 40, or a filler material or sealing member can be used to fill the gap, as described above with respect to the previous embodiments.

The end connector 40 is preferably sealed to the outer periphery of the inner support member 10 in a manner preventing the passage between the end connector 40 and the inner support member 10 of particles large enough to be removed by the filter body 20. A seal can be formed in any of the ways described with respect to the preceding embodiments. For example, the end connector 40 can be welded to the inner support member 10 in a fluidtight manner, or a sealing member, which can be any one of the various types described above, can be disposed between the end connector 40 and the inner support member 10. When the end connector 40 is not welded to the inner support member 10, a gasket material like that shown in FIGS. 10 and 11 installed on the inner periphery of the end connector 40 and overlapping the circumferential ends 42 is an example of a suitable sealing member.

In the present embodiment, the gap between the circumferential ends 42 of the end connector 40 in a closed state is sufficiently small that the circumferential ends 42 can be joined directly to each other. However, it is possible for the end connector to include member, such as an arcuate insert, which is disposed between the circumferential ends 42 of the split annulus, and for the circumferential ends 42 to be secured to the intermediate member rather than to be connected directly to each other.

Instead of the end connector 40 being transformed from an expanded state and a closed state by bending deformation, the end connector 40 may be equipped with a hinge having a lengthwise axis about which portions of the connector 40 can pivot between an expanded state and a closed state.

FIGS. 16 and 17 illustrate further embodiments of an end connector which can be employed in the present invention. Each end connector comprises an inner annular member in the form of an inner sleeve 50 surrounding the inner support member 10 and an outer annular member in the form of an outer sleeve 55 surrounding the inner sleeve 50. The inner sleeve 50 may be identical in structure to the end connector 30 of FIG. 4 or the end connector 40 of FIG. 12, for example. Namely, it may comprise a plurality of arcuate connector sections which are combined to form an annulus, or it may comprise a split annulus which can be deformed between an expanded state and a closed state to fit the annulus around the inner support member 10. The inner sleeve 50 has an inner lengthwise end which is connected to a filter body 20 and an outer lengthwise end. The inner lengthwise end may be formed with circumferentially-extending steps 51 or otherwise shaped to facilitate the connection of the inner lengthwise end to the filter body 20. The outer sleeve 55 may be a solid annulus, i.e., one which is not split and extends around the entire periphery of the inner sleeve 50. It has a minimum inner diameter which is large enough for it to pass over either end of the inner support member 10 but small enough for it to be joined to the inner sleeve 50.

The outer sleeve 55 may perform a variety of functions. For example, it may be used to protect the outer lengthwise end of the filter body 20 against impacts which might damage the filter body 20 or separate it from the inner sleeve 50, or it may be used as a primary or supplemental means for immobilizing the circumferential ends of the inner sleeve 50 with respect to each other by exerting a clamping force on the inner sleeve 50. Depending upon the function which it performs, it may be desirable to secure the outer sleeve 55 to the inner sleeve 50 in a manner resisting or limiting relative lengthwise movement of the two sleeves in response to axial force. The outer sleeve 55 can be secured to the inner sleeve 50 in any desired manner, including but limited to welding, threaded engagement, press-fitting, shrink fitting, and using connecting members such as pins or screws. In the embodiment of FIG. 16, the outer sleeve 55 is formed with internal threads 55a which screw onto external threads 50a formed on the inner sleeve 50. When the inner sleeve 50 is formed from a plurality of arcuate sections which are joined to one another, as in the embodiment of FIG. 4, in order to ensure that the threads 50a extend smoothly between adjoining arcuate sections, the inner sleeve 50 may be manufactured from a single cylindrical sleeve. After external threads 50a have been formed on the sleeve, the sleeve may be split longitudinally from one end to the other in a plurality of locations to form a plurality of connector sections. When the connector sections are reassembled around the inner support member 10 to form the inner sleeve 50, the threads 50a on the different connector sections can be aligned with each other so as to extend smoothly around the circumference of the inner sleeve 50 between the connector sections.

In the embodiment of FIG. 17, the outer sleeve 55 has a minimum inner diameter at room temperature which is smaller than the outer diameter of the inner sleeve 50, and the outer sleeve 55 is press fit or shrink fit onto the inner sleeve 50. In some cases, friction between the inner and outer sleeves 50 and 55 will be sufficient to prevent the sleeves from relative lengthwise movement during use of the filter. Alternatively, the sleeves 50 and 55 may be shaped so as to positively engage each other along their opposing peripheral surfaces to prevent relative lengthwise movement of the two sleeves. In FIG. 17, the inner peripheral surface of the outer sleeve 55 is formed with one or more protrusions 55b which fit into one or more corresponding recesses 50b in the outer peripheral surface of the inner sleeve 50 when the outer sleeve 55 is fit around the inner sleeve 50. Positive engagement between the inner and outer sleeves 50 and 55 can be achieved in a variety of other ways. For example, the outer surface of the inner sleeve 50 may be formed with one or more projections which engage with corresponding recesses in the inner periphery of the outer sleeve 55, the opposing surfaces may be formed with interfitting serrations, or the outer sleeve 55 may fit into a groove formed in the outer periphery of the inner sleeve 50.

The inner sleeve 50 may be sealed to the inner support member 10 by any of the ways described with respect to the end connectors 30 and 40 of the preceding embodiments. For example, a fluidtight weld may be formed between the inner sleeve 50 and the inner support member 10, or a sealing member can be installed between them.

The inner sleeve 50 may be left free to move in the lengthwise direction with respect to the inner support member 10, or it may be secured to the inner support member 10 by any of the methods described with respect to the preceding embodiments.

If the outer sleeve 55 is intended primarily as a means of protecting a lengthwise end of the filter body 20, the outer sleeve 55 may fit loosely around the inner sleeve 50 and may be capable of some lengthwise movement relative to the inner sleeve 50, although it may be desirable to prevent the outer sleeve 55 from impacting against the end of the filter body 20. The outer sleeve 55 can provide better protection to the filter body 20 if the outer sleeve 55 has a maximum outer diameter which is no smaller than the outer diameter of the outer lengthwise end of the filter body 20.

Figure 18:
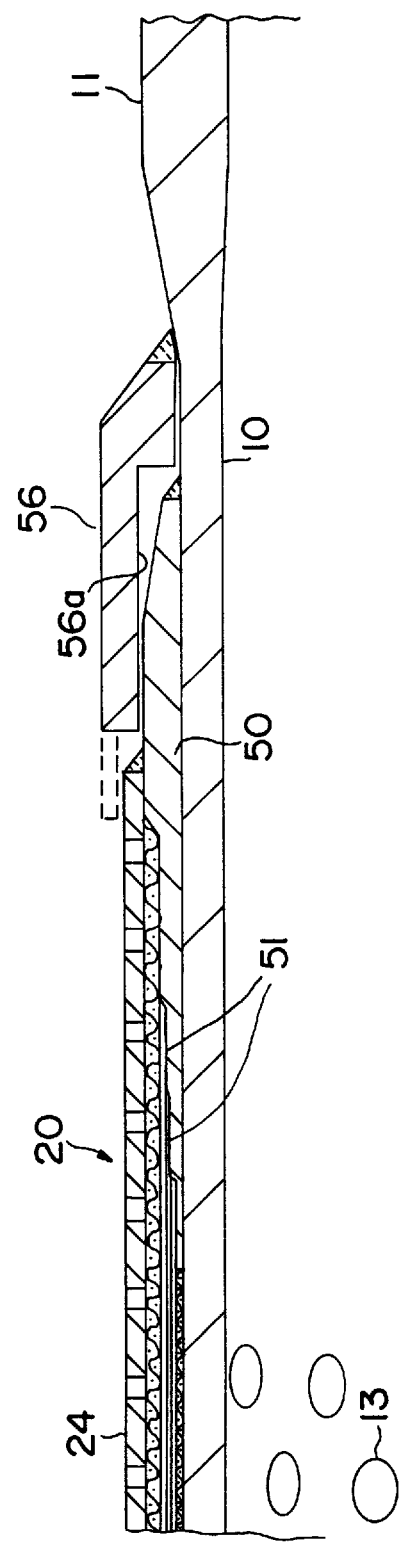
FIG. 18 is a longitudinal cross-sectional view of an end portion of another embodiment having an inner sleeve and an outer sleeve.

FIG. 18 is a longitudinal cross-sectional view of a portion of another embodiment of a filter having an end connector with an inner sleeve 50 and an outer sleeve 56 surrounding the inner sleeve 50. The inner sleeve 50 may have the same structure as the inner sleeve 50 of the embodiments of FIGS. 16 and 17, for example, and it may be sealed to the inner support member 10 in any of the various ways described with respect to those embodiments. The outer sleeve 56 differs from the outer sleeves 55 of FIGS. 16 and 17 in that its minimum inner diameter is smaller than the maximum outer diameter of the upset ends 11, 12 of the inner support member 10. Therefore, instead of being a solid one-piece member like outer sleeve 55, the outer sleeve 56 of this embodiment has a structure such that it is assembled around the inner support member 10 rather than being simply slipped over a lengthwise end of the inner support member 10. The outer sleeve 56 may comprise a plurality of arcuate sections which are combined to form an annulus, like the end connector 30 of FIG. 4, or it may comprise a split annulus like the end connector 40 of FIG. 12 which is deformed between an expanded state and a closed state to fit around the inner support member 10. In this example, the outer sleeve 56 comprises two generally semicylindrical sections which are welded to each other along lengthwise seams in the same manner as the end connector 30 of FIG. 4. Preferably, the maximum outer diameter of the outer sleeve 56 is no smaller than the outer diameter of the outer lengthwise end of the filter body 20 so that the outer sleeve 56 can protect the end of the filter body 20 against impacts in the lengthwise direction. The outer lengthwise end of the outer sleeve 56 may also overlap the outer lengthwise end of the inner sleeve 50 in the radial direction to protect the outer lengthwise end of the inner sleeve 50 against impacts. The length of the outer sleeve 56 is not critical. In the example of FIG. 18, the outer sleeve 56 has a cylindrical bore 56a which receives the outer lengthwise end of the inner sleeve 50 and extends to the vicinity of the outer lengthwise end of the filter body 20. As shown by the dashed lines in the figure, the outer sleeve 56 may in fact overlap the filter body 20 in the lengthwise direction to provide additional protection to the filter body 20. The outer sleeve 56 need not be sealed to the inner support member 10 or any other portion of the filter, so it may fit around the inner support member 10 and the inner sleeve 50 with any desired degree of tightness. For example, it may fit loosely around these members to facilitate assembly, or it may fit tightly around the inner sleeve 50 and exert a clamping force which immobilizes the circumferential ends of the inner sleeve 50 with respect to each other. If desired, the outer sleeve 56 may be secured to one or more of the inner support member 10, the inner sleeve 50, and the filter body 20 in any suitable manner. In FIG. 18, the outer sleeve 56 is rigidly secured to the inner support member 10 by welding but is not secured to the inner sleeve 50 so that lengthwise impacts against the outer sleeve 56 can be transmitted directly to the inner support member 10 without being applied to the inner sleeve 50 or the filter body 20. Alternatively, the outer sleeve 56 may be free to slide along the inner support member 10, with its dimensions preferably chosen so that it does not impact the outer lengthwise end of the filter body 20.

Compared with the one-piece outer sleeves 55 of FIGS. 16 and 17 of the same outer diameter, the outer sleeve 56 of FIG. 18 has a more robust cross section at its outer lengthwise end since its inner periphery can extend all the way to the outer periphery of the inner support member 10. Therefore, it can provide greater protection to the filter body 20 against lengthwise impacts. An outer sleeve 56 of this type can be used at either end of the filter body 20.

The filter of FIG. 18 will typically be assembled by installing two inner sleeves 50 on the inner support member 10 and then assembling the filter body 20 between the inner sleeves 50. Assembling the filter body 20 includes passing an outer cage 24 of the filter body 20 over the inner sleeves 50 in the lengthwise direction and securing the cage 24 to the outer periphery of the inner sleeves 50. After the filter body 20 has been connected to the inner lengthwise ends of the inner sleeves 50, an outer sleeve 56 can be installed on the inner support member 10 around each of the inner sleeves 50.

Figure 19:
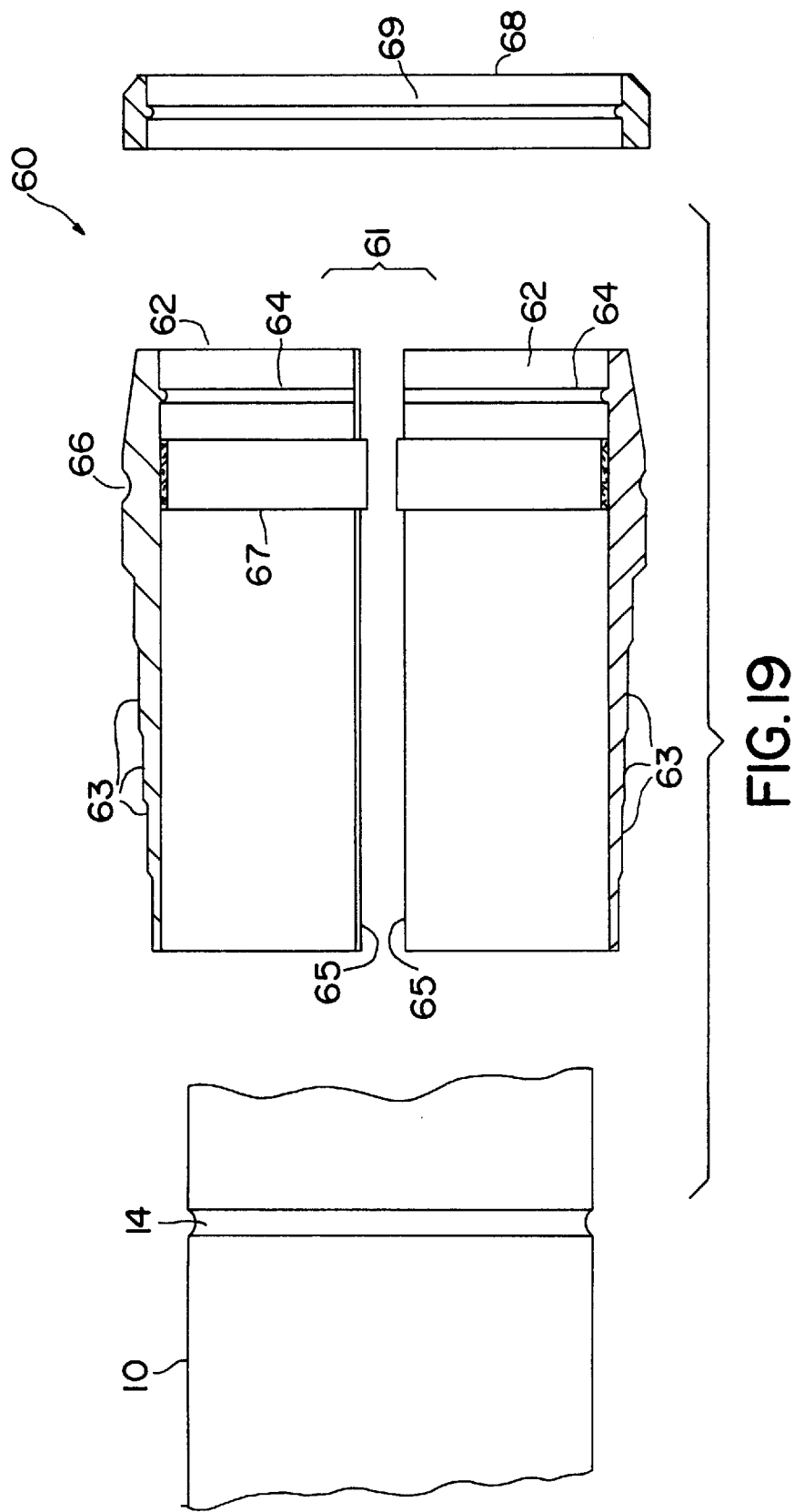
FIG. 19 is a partially cross-sectional exploded view of an embodiment of an end connector according to the present invention which is mounted on an inner support member without welding.

There may be situations in which it is desired to secure an end connector to an inner support member without welding, such as when the end connector and the inner support member are made of metals which are difficult to weld to each other, or when one of the inner support member and the end connector is polymeric while the other is metallic. FIGS. 19 and 20 illustrate an embodiment of a metal end connector 60 of a filter according to the present invention which is secured to a polymeric inner support member 10 without welding. FIG. 19 is an exploded cross-sectional view of the end connector 60, and FIG. 20 is a longitudinal cross-sectional view of the end connector 60 in an assembled state. The end connector 60 comprises an inner sleeve 61 arranged around the inner support member 10. The inner sleeve 61 comprises a plurality of arcuate connector sections 62 (in this case, two semicylindrical sections 62) which may be similar to the connector sections 31 of FIG. 4, each connector section 62 having an inner lengthwise end (the left end in FIG. 19) which can be connected to an unillustrated filter body and an outer lengthwise end (the right end in FIG. 19) which faces away from the filter body. The inner lengthwise end of each connector section 62 may be formed with circumferentially extending steps 63 or be otherwise shaped to facilitate the connection of the inner lengthwise end to a filter body. Circumferentially extending steps 63 are formed around the outer periphery of the inner lengthwise end for supporting the filter body. The inner periphery of each connector section 62 and the outer periphery of the inner support member 10 have engaging portions which can interfit or otherwise engage with each other to prevent the relative movement in the lengthwise direction of the inner support member 10 and the connector sections 62. The engaging portions can have any structure which resists relative lengthwise movement of the inner support member 10 and the connector sections 62. For example, the engaging portions may comprise teeth, threads, or interfitting projections and recesses. Alternatively, pins, keys, screws, etc. can be employed to interconnect the connector sections 62 and the inner support member 10. In this embodiment, the inner support member 10 includes an engaging portion in the form of a circumferentially extending groove 14 in its outer surface, while the connector sections 62 include engaging portions in the form of projections 64 formed around the inner periphery of the connector sections 62 and extending radially inwards towards the inner support member 10. If the engagement between the engaging portions is not sufficient to form a seal, a sealing member may be provided for preventing the passage between the inner sleeve 61 and the inner support member 10 of particles large enough to be removed by the filter body 20. In the present embodiment, a sealing member 67 in the form of a gasket such as that described with respect to FIG. 10 is mounted on the inner periphery of each connector section 62 so as to overlap the circumferential ends 65 of the connector sections 62 in the manner shown in FIG. 11. Other methods described with respect to the previous embodiments for sealing an end connector to an inner support member may also be employed.

The connector sections 62 of the inner sleeve 61 may be immobilized with respect to each other in any of the ways described with respect to the preceding embodiments. When the inner support member 10 is polymeric, it may be undesirable to employ welding to immobilize the connector sections 62, even when the connector sections 62 are metallic, since the heat of welding may damage the inner support member 10. Therefore, in the present embodiment, an outer sleeve 68 similar to the one illustrated in FIG. 17 is used to press the connector sections 62 of the inner sleeve 61 against the inner support member 10 and immobilize the connector sections 62 with respect to each other. The outer sleeve 68 has a minimum inner diameter in a relaxed state which is smaller than the maximum outer diameter of the inner sleeve 61 in an assembled state. After the connector sections 62 of the inner sleeve 61 have been disposed around the inner support member 10 to form an annulus, the outer sleeve 68 can be press fit, shrink fit, or otherwise fit around the inner sleeve 61 to urge the connector sections 62 of the inner sleeve 61 radially inwards towards the inner support member 10 and to compress the sealing member 67 against the inner support member 10 to an extent that the sealing member 10 can prevent the passage of particles large enough to be removed by the filter body 20. The opposing surfaces of the inner and outer sleeves 61 and 68 may be formed with engaging portions for preventing movement in the lengthwise direction of the outer sleeve 68 in the same manner as in the embodiments of FIGS. 16 and 17. For example, in this embodiment, the outer sleeve 68 is formed with a radially inward projection 69 which extends around its inner periphery, and each of the connector sections 62 of the inner sleeve 61 is formed with a groove 66 in its outer periphery for receiving the projection 69 formed on the outer sleeve 68.

In FIG. 20, the inner support member 10 is illustrated as being formed from a polymeric material, while the end connector 60 is illustrated as being metallic, but the structure employed in this embodiment is not dependent upon the materials of which the inner support member 10 and the end connector 60 are formed. For example, the construction may be all polymeric or all metallic.

FIG. 21 is a longitudinal cross-sectional view of another embodiment of the present invention. This embodiment is similar to the embodiment of FIG. 20, but the outer sleeve 68 of that embodiment has been replaced with a ring 70 or other member of any desired cross-sectional shape which is cast in place around the inner sleeve 61 in the grooves 66 of the connector sections 62 forming the inner sleeve 61. In order to assemble the end connector of FIG. 21, the connector sections 62 of the inner sleeve 61 are clamped together around the inner support member 10 with the grooves 66 of the two connector sections 62 aligned with each other in the circumferential direction so as to extend continuously around the circumference of the inner sleeve 61. A mold is placed around the inner sleeve 61 to surround the grooves 66, and a suitable molten metal (zinc or stainless steel, for example) compatible with the material of which the inner sleeve 61 is made is poured into the mold to fill the grooves 66 around the entire periphery of the inner sleeve 61. When the molten metal solidifies, it forms a solid, rigid ring 70 which secures the connector sections 62 to each other. If the connector sections 62 are compressed against the inner support member 10 during the casting operation, the ring 70 can maintain the connector sections 62 pressed against the inner support member 10.

In this embodiment, a cast-in-place member is used as the sole means for immobilizing the connector sections 62 with respect to each other. However, a cast-in-place member may also be used in addition to other means for immobilizing connector sections with respect to each other, such as a weld forming a lengthwise seam. Furthermore, a cast-in-place member can be used regardless of the type of connection between the inner sleeve 61 and the inner support member 10. Thus, the inner sleeve 61 may be free so slide with respect to the inner support member 10, or it may connected to the inner support member 10 by a method other than the inteffitting engagement illustrated in FIG. 21.

Instead of comprising a plurality of discrete arcuate sections 62, the inner sleeve 61 in FIGS. 19–21 may comprise a split annulus as in the embodiment of FIGS. 12–15.

FIG. 22 illustrates another embodiment of an end connector 80 which is secured to an inner support member 10 without welding. This end connector 80 includes a sleeve 81 which surrounds the inner support member 10 and a cast-in-place ring 85 which surrounds both the inner support member 10 and a portion of the sleeve 81. The ring 85 engages with the inner support member 10 and the sleeve 81 to limit or prevent the lengthwise movement of the sleeve 81 with respect to the inner support member 10. The inner support member 10 is shown as being made of a polymeric material, but it may be made of any material will not be damaged by the casting process used to form the ring 85. The sleeve 81 has an inner lengthwise end (the left end in the figure) which is sealingly connected to an unillustrated filter body and an outer lengthwise end which faces away from the filter body. The inner lengthwise end of the sleeve 81 may be formed with circumferentially extending steps 82 or otherwise shaped to facilitate the connection of the inner lengthwise end to the filter body. The sleeve 81 may have any structure which enables it to be mounted on the inner support member 10. For example, the sleeve 81 may comprise a plurality of discrete, arcuate sections which are combined to form an annulus, like the end connector 30 of the embodiment of FIG. 4, or it may comprise a split annulus like the end connector 40 of the embodiment of FIG. 12. The cast-in-place ring 85 overlaps the outer lengthwise end of the sleeve 81 in the lengthwise direction. The overlapping portions of the sleeve 81 and the ring 85 have interfitting portions which resist or limit relative lengthwise movement of the sleeve 81 and the ring 85. In the present embodiment, the sleeve 81 has a circumferentially extending recess 83 formed in its outer surface at its outer lengthwise end, and the cast-in-place ring 85 has an radially inward projection 86 which engages with and fills the recess 83. The recess 83 and the corresponding projection 86 need not have any particular shape or dimensions. In the present embodiment, both the recess 83 and the projection 86 extend around the entire circumference of the sleeve 81, but alternatively, each may extend around only a portion of the circumference. The ring 85 also has a portion which engages with the inner support member 10 to limit or prevent the relative lengthwise movement of the ring 85 and the inner support member 10. In the present embodiment, the ring 85 is formed with a radially inward projection 87 which extends around the inner circumference of the inner support member 10 and engages with and fills a circumferentially extending groove 14 formed in the outer periphery of the inner support member 10.

The opposing circumferential ends of the sleeve 81 may be immobilized with respect to each other in any of the ways described with respect to the previous embodiments. For example, the sleeve 81 may have one or more welded seams between opposing circumferential ends of the sleeve 81, like the end connectors of FIGS. 4 or 12. Alternatively, the cast-in-place ring 85 may be used to exert a clamping force on the sleeve 81 to immobilize the circumferential ends with respect to each other and give the sleeve 81 sufficient rigidity that it is unnecessary to form a weld between the opposing circumferential ends of the sleeve 81. As still another alternative, an outer sleeve like those shown in FIGS. 16, 17, 19, and 20 which is separate from the cast-in-place ring 85 can be used to exert a clamping force on the sleeve 81.

The contact between the cast-in-place ring 85, the inner support member 10, and the sleeve 81 may be sufficient to form a seal which can prevent particles large enough to be removed by the filter body from bypassing the filter body by passing between the sleeve 81 and the inner support member 10. Alternatively, a sealing member may be disposed in a suitable location, such as between the inner periphery of the sleeve 81 and the outer periphery of the inner support member 10, as described with respect to the embodiment of FIG. 19, for example.

The cast-in-place ring 85 can be formed around the inner support member 10 and the sleeve 81 by a conventional casting process, either before or after the sleeve 81 has been connected to the filter body. The casting process employed preferably permits the distance between the groove 14 in the inner support member 10 and the recess 83 in the sleeve 81 to vary within a range, so that after the sleeve 81 has been connected to the filter body, the filter body and the sleeve 81 can be moved together along the inner support member 10 to a desired location and the ring 85 can then be cast around the sleeve 81 and the inner support member 10 to fix or limit the lengthwise position of the sleeve 81 with respect to the inner support member 10.

The shape of the ring 85 is not critical. In FIG. 22, the ring 85 has the shape of a body of revolution, and the outer periphery of the ring 85 is flush with the outer periphery of the sleeve 81. However, the shape of the ring 85 may vary around its circumference, and if the ring 85 is cast around the sleeve 81 after the filter body has been assembled and connected to tan outer diameter which is larger than with an outer diameter which is larger than the outer diameter of the sleeve 81, like the outer sleeve 56 of FIG. 18, to protect the lengthwise end of any portion of the filter body having a larger outer diameter than the sleeve 81.

A member for engaging with the sleeve 80 and the inner support member 10 to prevent or limit their relative movement is not limited to being a cast-in-place ring 85. For example, the ring 85 of FIG. 22 may be replaced by a multi-section sleeve or ring or a split sleeve or ring which is assembled around the sleeve 80 and the inner support member 10 to engage the two in a manner similar to the ring 85. If desired, a groove 14 in the inner support member 10 or the recess 83 in the sleeve 81 may be made longer than the corresponding projection in the ring or sleeve with which it engages to enable the sleeve 81 to undergo lengthwise movement relative to the inner support member 10.

EXAMPLE

A filter according to the present invention like that illustrated in FIG. 2 was prepared in the following manner.

An inner support member 10 in the form of a carbon steel API pipe with two externally upset ends 11, 12 was used as an inner support member 10. The inner support member 10 had a nominal OD of 2.875 inches in its midportion and an upset OD (the maximum OD of each upset end) of 3.21 inches. The inner support member 10 was perforated with holes 13 over a portion of its length. Two end connectors 30 having the shape shown in FIGS. 4–9 were assembled on the inner support member 10. Each end connector 30 comprised two semicylindrical connector sections 31 made of 316L stainless steel. Each pair of connector sections 31 was formed from a single cylinder which was cut in the lengthwise direction from one end to another by wire electrical-discharge machining. Each connector section 31 had a V-shaped recess 33 at one circumferential end and a wedge-shaped projection 34 complementary to the V-shaped recess 33 at the other circumferential end. Each pair of connector sections 31 was disposed around the inner support member 10 with the projection 34 on each connector section 31 inserted into the recess 33 on the other connector section 31 of the pair, and the two connector sections 31 were fusion welded to each other to a depth of at least ⅟₃₂inch to form lengthwise seams extending over the entire length of the connector sections 31. The connector sections 31 were also fusion welded to each other along the axially-facing end surfaces at their outer lengthwise ends. The outer lengthwise end of each end connector 30 was then welded to the inner support member 10 by GTAW welding around the entire circumference of the inner support member 10 to secure the end connector 30 to the inner support member 10 in a fluidtight manner.

A filter body 20 having the structure shown in FIG. 3 was then formed around the inner support member 10 between the end connectors 30. First, a layer of square weave wire mesh of 316L stainless steel (14×14×.020 inches) was cylindrically wrapped around the inner support member 10 and resistance welded to the inner lengthwise ends of the end connectors 30 and to itself along a lengthwise seam to form an inner drainage layer 21. Four layers 22 of a 316L stainless steel sintered supported porous metal membrane manufactured by Pall Corporation and sold under the trademark PMM were then wrapped around the inner drainage layer 21. All the layers 22 of PMM had the same mean pore size of approximately 80 μm and a uniform thickness of approximately 0.015 inches per layer. Each layer 22 was individually wrapped and welded to itself and to the inner lengthwise end of each end connector 30 to form a lengthwise seam without the layers 22 being joined to each other between their lengthwise ends, thereby allowing the filter layers 22 to shift during deformation of the filter. The lengthwise seams of adjoining layers 22 were staggered in the circumferential direction of the filter. An unillustrated copper chill strip measuring 0.010 inches thick was placed between each layer 22 during welding.

An outer drainage layer 23 comprising a layer of 316L stainless steel square weave mesh (14×14×0.013 inches) was then wrapped around the PMM layers 22 and welded to the inner lengthwise ends of the end connectors 30 and to itself to form a lengthwise seam.

A perforated spiral welded carbon steel outer cage 24 (wall thickness of 0.090 inches) having an inner diameter of 3.301 inches was then slipped over the upset ends of the inner support member 10, the wrapped layers 21–23, and the end connectors 30 and fully GTAW welded at each lengthwise end to one of the end connectors 30 to obtain a completed filter.

What is claimed is:

1. A filter for subterranean environments comprising:
   an inner support member capable of transporting fluid in a lengthwise direction thereof and having first and second lengthwise ends;
   a filter body including a filter medium disposed around the inner support member between the lengthwise ends of the inner support member; and
   an annular end connector surrounding the inner support member and connected to a lengthwise end of the filter body and having a minimum inner diameter smaller than a maximum outer diameter of either of the lengthwise ends of the inner support member.

2. A filter as claimed in claim 1 wherein the inner support member comprises a pipe having externally upset ends.

3. A filter as claimed in claim 1 wherein the end connector comprises a metal.

4. A filter as claimed in claim 1 wherein the end connector comprises a plurality of discrete arcuate connector sections each extending around only a portion of a periphery of the inner support member and together defining an annulus.

5. A filter as claimed in claim 4 wherein the end connector comprises two semicylindrical connector sections.

6. A filter as claimed in claim 4 wherein the connector sections are secured to each other along lengthwise welded seams.

7. A filter as claimed in claim 1 wherein the end connector comprises a split annulus having circumferential ends which are immobilized with respect to each other.

8. A filter as claimed in claim 7 wherein the circumferential ends are joined to each other along a lengthwise seam extending between lengthwise ends of the end connector.

9. A filter as claimed in claim 1 wherein the end connector comprises an inner annular member having a minimum inner diameter smaller than the maximum outer diameter of either of the lengthwise ends of the inner support member, and an outer annular member surrounding the inner annular member and having a minimum inner diameter larger than the maximum outer diameter of one of the lengthwise ends of the inner support member.

10. A filter as claimed in claim 9 wherein the inner annular member comprises a plurality of discrete arcuate connector sections each extending around only a portion of a periphery of the inner support member and together defining an annulus.

11. A filter as claimed in claim 9 wherein the inner annular member comprises a split annulus.

12. A filter as claimed in claim 1 wherein the end connector has a lengthwise seam extending between opposite lengthwise ends of the end connector.

13. A filter as claimed in claim 1 wherein the end connector comprises an inner annular member surrounding the inner support member and connected to a lengthwise end of the filter body, and a cast-in-place member which is cast in place around the inner annular member.

14. A filter as claimed in claim 13 wherein the cast-in-place member engages a recess formed in an outer periphery of the inner annular member.

15. A filter as claimed in claim 13 wherein the cast-in-place member engages the inner annular member and the inner support member to restrict movement of the inner annular member along the inner support member.

16. A filter as claimed in claim 13 wherein the cast-in-place member is annular.

17. A filter as claimed in claim 13 wherein the inner annular member has circumferential ends which are immobilized with respect to each other by the cast-in-place member.

18. A filter as claimed in claim 1 wherein the end connector and the inner support member have engaging portions which resist relative movement of the end connector and the inner support member in the lengthwise direction of the inner support member.

19. A filter as claimed in claim 1 including a sealing member disposed between the end connector and the inner support member.

20. A filter as claimed in claim 1 wherein the filter medium comprises a medium for removing particles from a well fluid.

21. A filter as claimed in claim 20 wherein the filter is in fluid communication with a member for transporting a fluid that has passed through the filter.

22. A filter arrangement according to claim 21 wherein the member for transporting a fluid comprises a pipe string.

23. A filter arrangement according to claim 22 wherein the pipe string comprises a production pipe string.

24. A filter arrangement according to claim 22 wherein the pipe string comprises a drill string.

25. A filter arrangement according to claim 21 wherein the member for transporting a fluid comprises coiled tubing.

26. A filter arrangement according to claim 21 wherein the member for transporting a fluid comprises a downhole pump.

27. A filter arrangement according to claim 21 wherein the member for transporting a fluid comprises another filter.

28. A filter for subterranean environments comprising:
   an inner support member capable of transporting fluid in a lengthwise direction thereof;
   a filter body surrounding the inner support member and including a filter medium; and
   an annular end connector surrounding the inner support member and connected to a lengthwise end of the filter body, the end connector comprising a plurality of discrete arcuate connector sections each extending around only a portion of a periphery of the inner support member and together defining an annulus.

29. A filter for subterranean environments comprising:
   an inner support member capable of transporting fluid in a lengthwise direction thereof;

a filter body surrounding the inner support member and including a filter medium; and an annular end connector surrounding the inner support member and connected to a lengthwise end of the filter body and comprising a split annulus having circumferential ends which are immobilized with respect to each other.

30. A filter for subterranean environments comprising:

an inner support member capable of transporting fluid in a lengthwise direction thereof;

a filter body surrounding the inner support member and including a filter medium; and an annular end connector surrounding the inner support member and connected to a lengthwise end of the filter body and having a lengthwise seam extending between opposite lengthwise ends of the end connector.

31. A filter for subterranean environments comprising:

an inner support member capable of transporting fluid in a lengthwise direction thereof and having first and second lengthwise ends;

a filter body including a filter medium disposed around the inner support member between the lengthwise ends of the inner support member;

an inner annular member surrounding the inner support member and connected to a lengthwise end of the filter body; and a cast-in-place member which is cast in place around the inner annular member.

32. A method of assembling a filter comprising:

forming a filter body including a filter medium around an elongated inner support member capable of transporting a fluid in a lengthwise direction thereof;

disposing an annular end connector around the inner support member without passing a lengthwise end of the inner support member through the end connector; and connecting the end connector to a lengthwise end of the filter body.

33. A method as claimed in claim 32 wherein disposing the end connector around the inner support member comprises disposing a plurality of connector sections on the inner support member and immobilizing the connector sections with respect to each other.

34. A method as claimed in claim 33 including joining circumferential ends of adjoining ones of the connector sections to each other.

35. A filter as claimed in claim 32 including disposing a sealing member between the end connector and the inner support member.

36. A method of assembling a filter comprising:

forming a filter body including a filter medium around an elongated inner support member capable of transporting fluid in a lengthwise direction thereof;

disposing an end connector comprising a split annulus having first and second circumferential ends around the inner support member; immobilizing the circumferential ends with respect to each other; and connecting the end connector to a lengthwise end of the filter body.

* * * * *